United States Patent [19]

Rutherford et al.

[11] Patent Number: 4,661,861
[45] Date of Patent: Apr. 28, 1987

[54] LASER PRINTING FACSIMILE RECEIVER

[75] Inventors: David G. Rutherford, North Caldwell; Bernd Helling, Old Bridge; David M. Shearn, Somerset; David Shaler, Madison, all of N.J.

[73] Assignee: The Associated Press, East Brunswick, N.J.

[21] Appl. No.: 741,290

[22] Filed: Jun. 4, 1985

[51] Int. Cl.$^4$ .................. H04N 1/23; H04N 1/40; G01D 9/42

[52] U.S. Cl. .................... 358/302; 358/300; 358/280; 346/108

[58] Field of Search ............... 346/108; 358/300, 302, 358/280, 285, 264; 340/108; 369/116, 106

[56] References Cited

U.S. PATENT DOCUMENTS

| | | | |
|---|---|---|---|
| 3,705,758 | 12/1972 | Haskal | 346/108 X |
| 4,028,732 | 6/1977 | Salter et al. | 358/302 X |
| 4,089,008 | 5/1978 | Suga et al. | 358/300 |

FOREIGN PATENT DOCUMENTS 2054888 2/1981 United Kingdom .

Primary Examiner—Harold Broome
Assistant Examiner—Linda M. Peco
Attorney, Agent, or Firm—Arthur L. Lessler

[57] ABSTRACT

A facsimile receiver of the type in which a laser beam modulated by a received video signal scans a light sensitive recording paper to print an image corresponding to the video signal. A feedback loop insures that the output of the laser beam acousto-optical modulator (AOM) accurately tracks the demodulated received video signal. A variable transmissivity filter in the path of the laser beam is automatically positioned to provide increased transmittance as the laser beam intensity decreases with aging of the laser, so as to maintain a constant light output intensity. A lens in the optical system which focuses the laser beam on the paper is moved mechanically as the paper is transversely scanned, so that the focus of the beam is varied to compensate for the planar (non-cylindrical) configuration of the paper, thus keeping the beam focused on the paper throughout the length of each scan line. To minimize bleeding or spreading of the image on the paper, the laser beam output is pulse width modulated inversely with variations in the video signal amplitude, so as to maintain a substantially constant energy per pulse. The amplitude of vertical dither is also varied inversely with the video signal amplitude, to minimize spreading of the scan lines at higher light beam intensity levels. Ripple and patterning in the printed image due to D.C. offset are reduced for video signals transmitted by frequency modulation (FM) or by amplitude modulation (AM), by measuring the duration (for FM) or amplitude (for AM) of each carrier half-cycle and adding a D.C. level to the modulated carrier to minimize the differences in duration or amplitude between successive half-cycles. The demodulated FM video signal is automatically offset and scaled to utilize the entire gray scale dynamic range of the paper on which the image is printed.

32 Claims, 23 Drawing Figures

Microfiche Appendix Included
(2 Microfiche, 101 Pages)

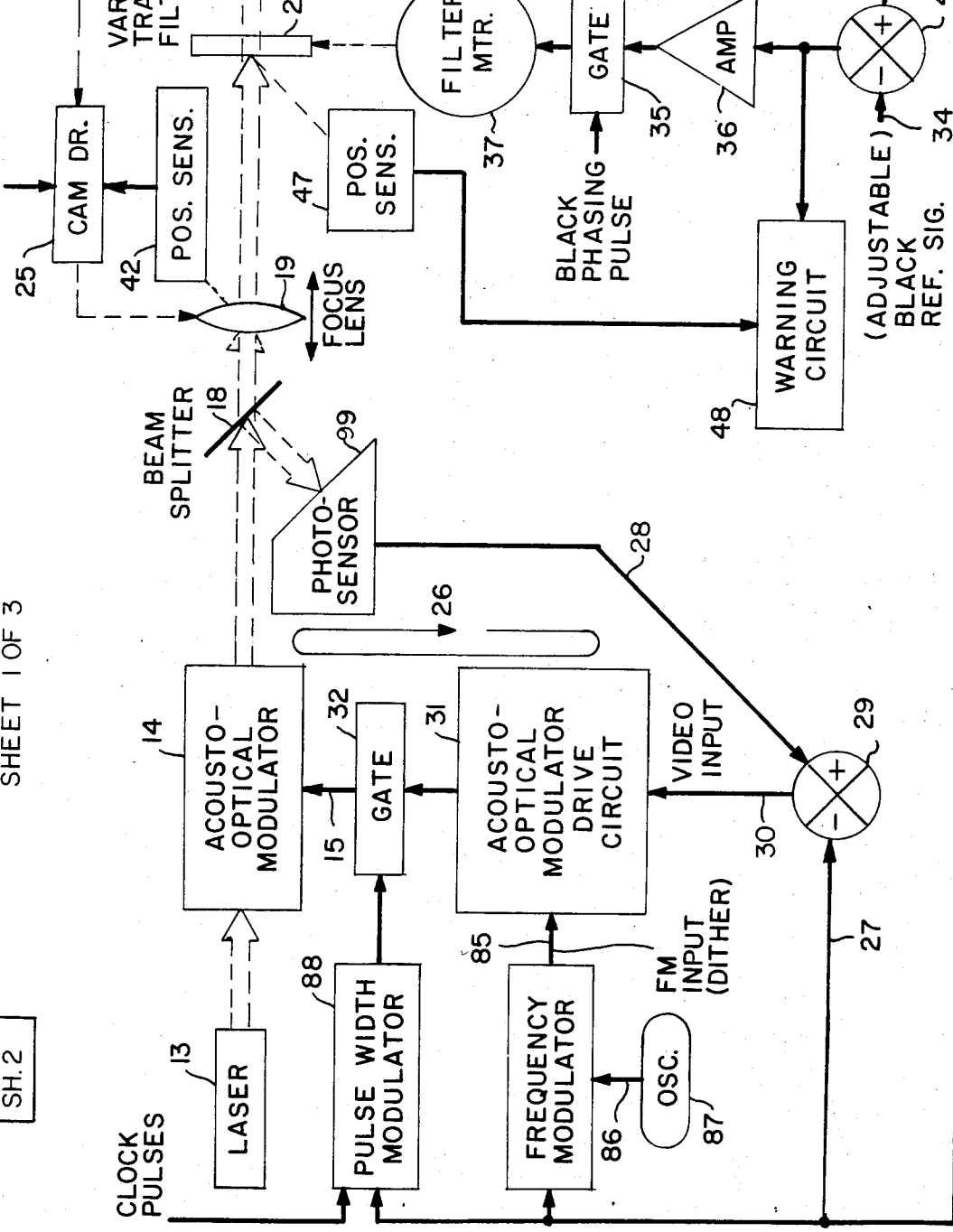

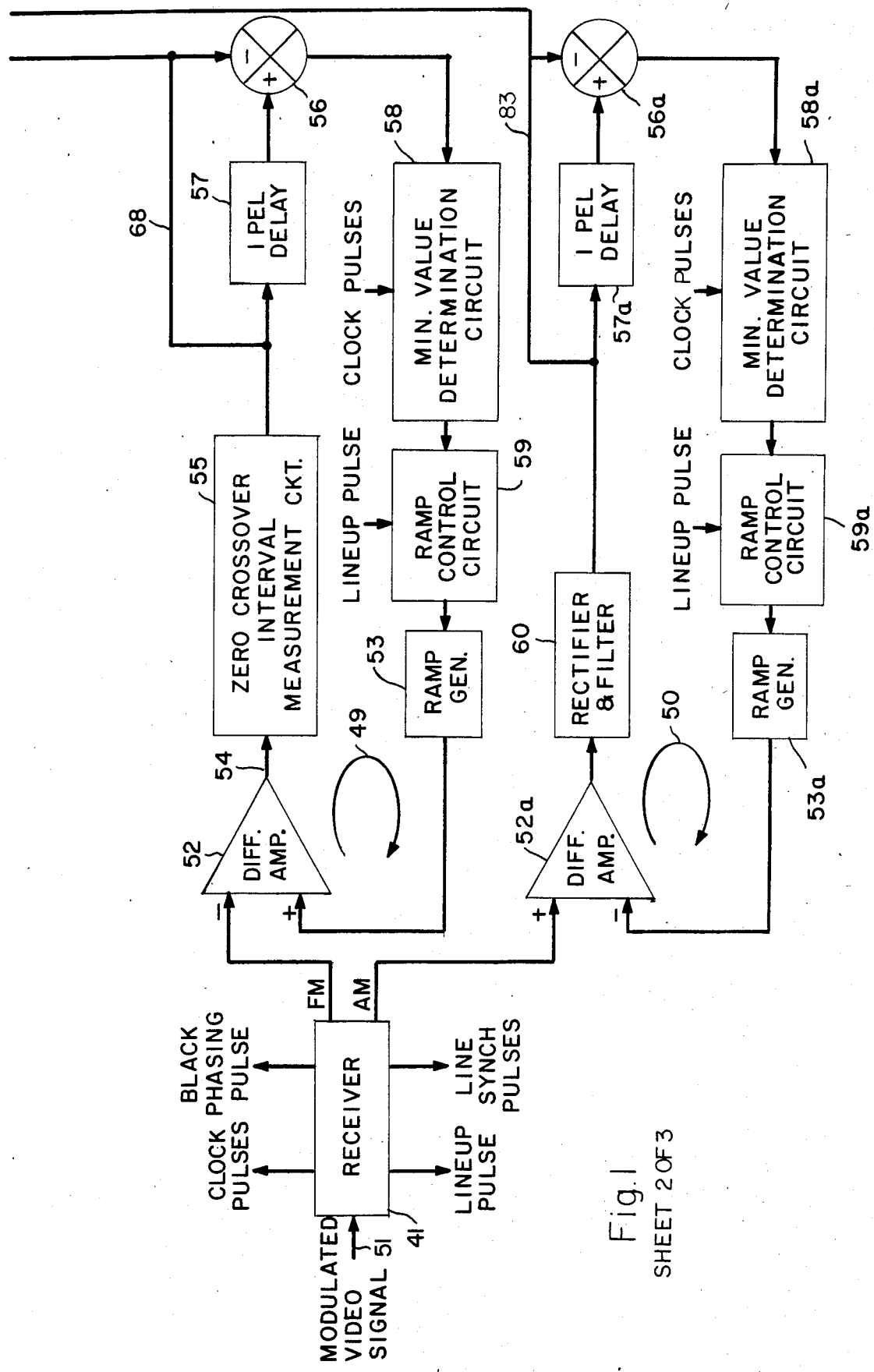
Fig.1 SHEET 2 OF 3

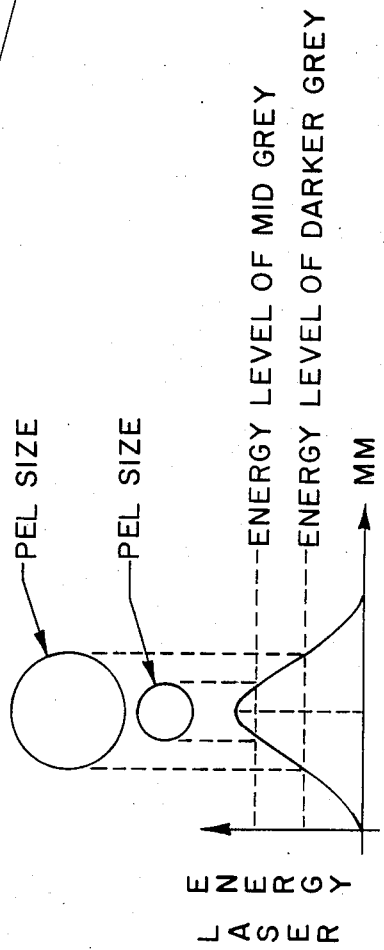

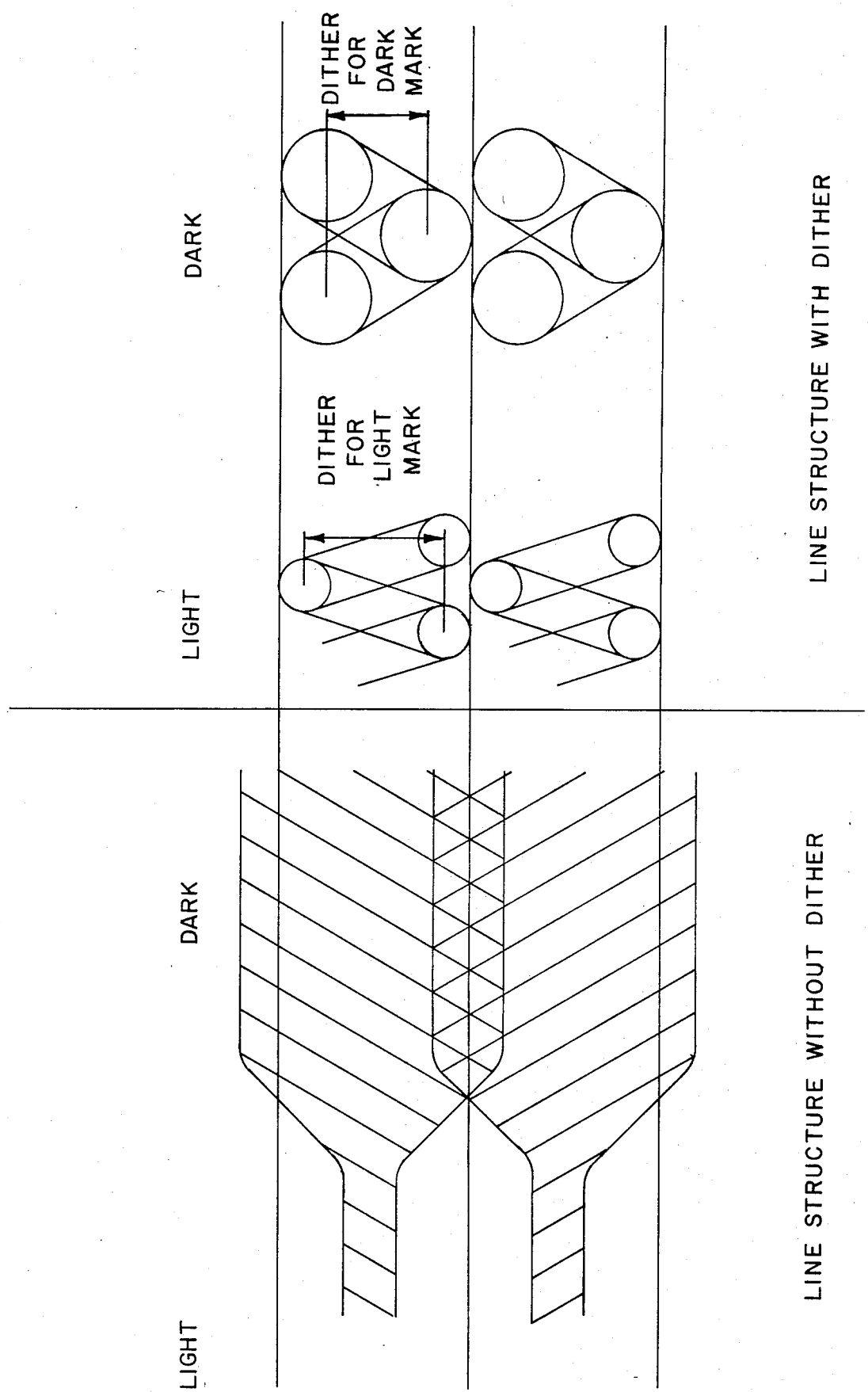

DISTORTED WAVEFORM
(NO OFFSET DISTORTION)

ZERO CROSSINGS OF DISTORTED WAVEFORM

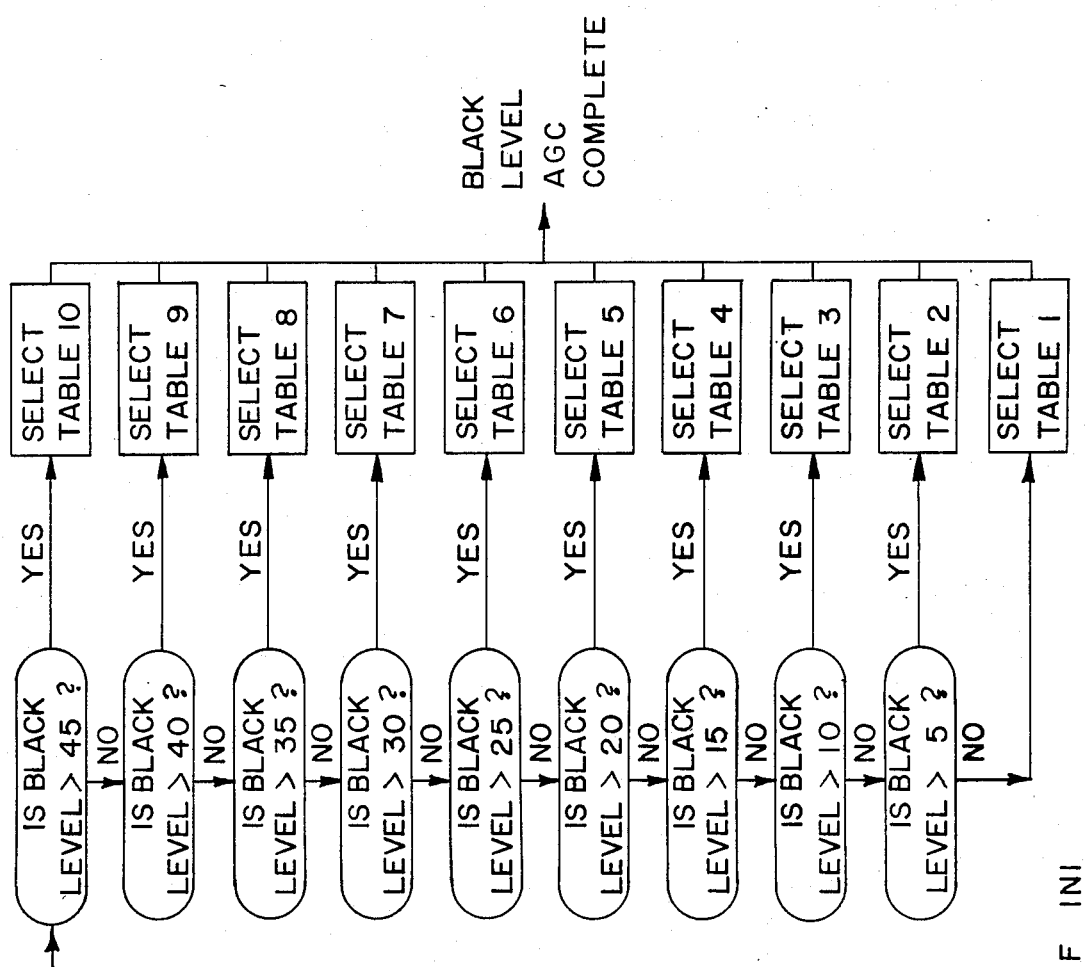
Fig. 7 SHEET 2 OF 2
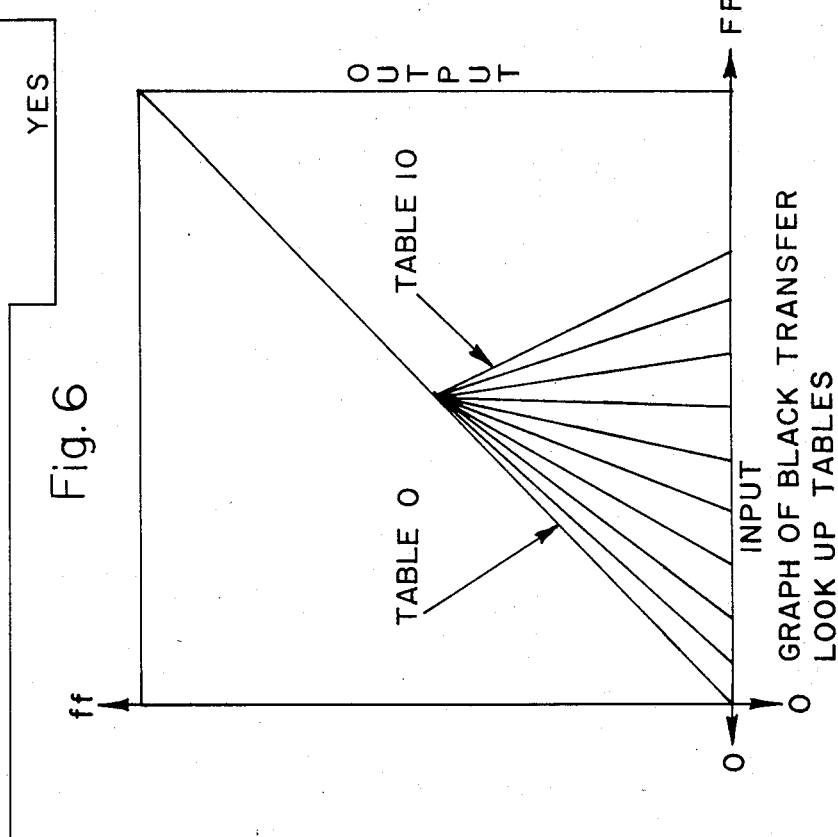
Fig. 6 GRAPH OF BLACK TRANSFER LOOK UP TABLES

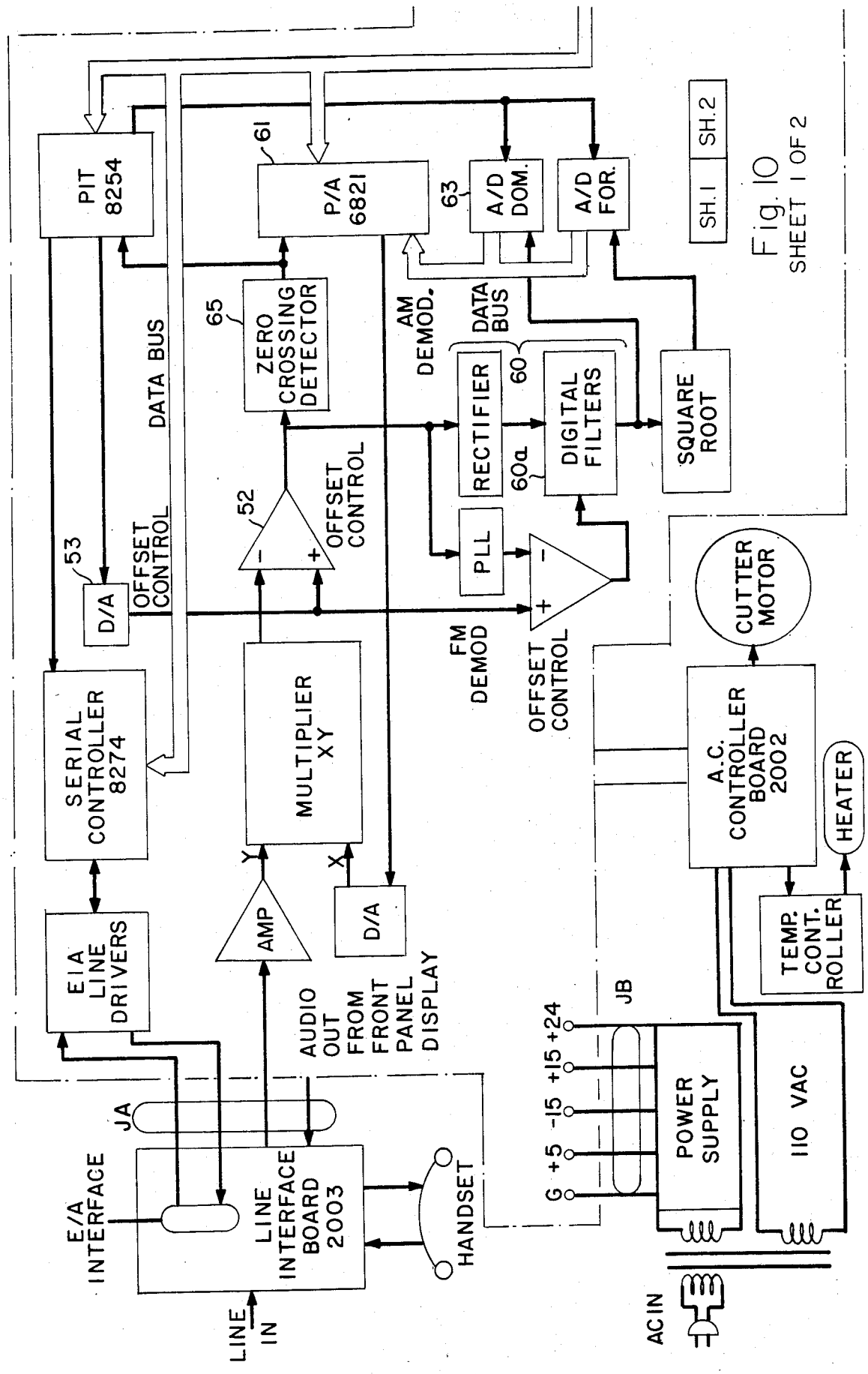
Fig. 10 SHEET 1 OF 2

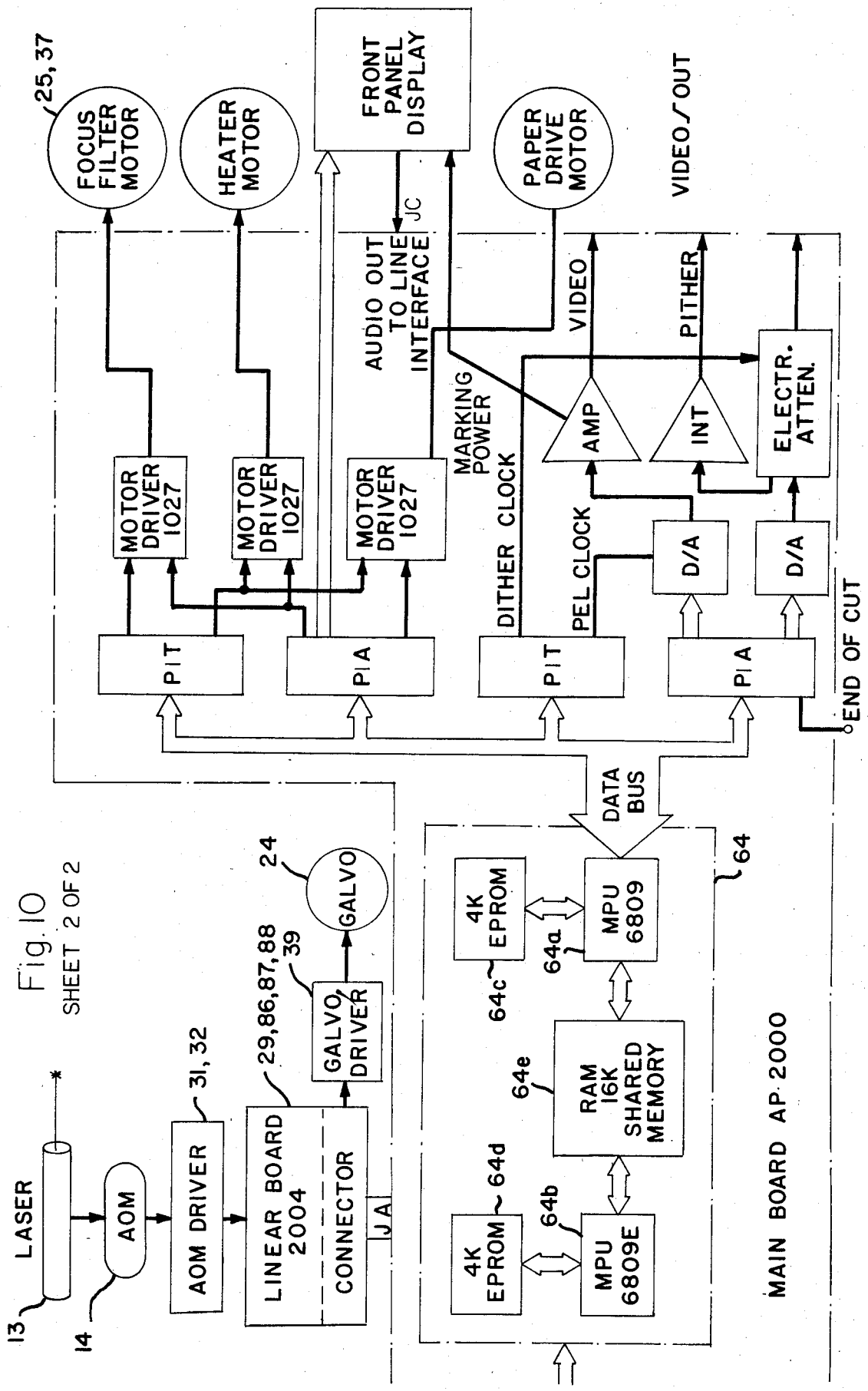
Fig. 10 SHEET 2 OF 2

LASER PRINTING FACSIMILE RECEIVER

The file of this application contains a microfiche appendix comprising two microfiche containing 101 frames, setting forth the program listing used in the preferred embodiment of the invention.

BACKGROUND OF THE INVENTION

This invention relates to a facsimile receiver which is particularly suitable for, but not limited to, the reproduction of photographic and similar images, by causing a modulated light beam to scan a light sensitive record medium. The invention is an improvement upon the type of facsimile receiver described in U.S. Pat. No. 3,997,722, the disclosure of which is incorporated herein by reference.

The facsimile receiver described in U.S. Pat. No. 3,997,722 employs a helium-neon laser to generate a light beam. An acousto-optical modulator (i) modulates the intensity of the light beam in accordance with the demodulated incoming video signal, and (ii) deflects the light beam longitudinally of a light sensitive dry silver paper to dither the light beam so as to reduce or eliminate visible scan lines in the image formed on the paper. A paper transport moves the paper longitudinally while a rotatably reciprocating scan mirror deflects the light beam to scan across the paper in transverse lines to print the image thereon.

This prior art facsimile receiver suffers from the following deficiencies, among others:

a. As the laser ages, the intensity of the light beam decreases substantially, adversely affecting the printed image.

b. The scan mirror causes the focal point of the light beam to scan along a circular arc, whereas the paper surface lies in a plane. As a result, in each scan line the light beam is in focus at only the two points where the focus arc intersects the paper surface, so that the sharpness of the printed image is reduced.

c. The dry silver paper is heat sensitive as well as light sensitive, so that the size of the "spot" or "pel" on the paper varies with the light intensity changes due to the variations of the video signal, resulting in a decrease of image sharpness.

d. Variations in the video signal carrier amplitude (in the case of amplitude modulation) or period (in the case of frequency modulation) between half-cycles due to transmission noise and ripple result in undesirable patterning visible in the printed image.

An object of the present invention is to provide an improved facsimile receiver of the aforementioned type.

SUMMARY OF THE INVENTION

As herein described, according to one aspect of the invention there is provided a method and apparatus for converting a received facsimile video signal containing a scan line synchronization signal to a printed image, comprising the steps of: providing an output light beam; moving a light sensitive record medium in a longitudinal direction; intensity modulating said light beam in accordance with the value of said video signal, by the steps of: providing an optical sample of the intensity modulated light beam, generating a modulator output intensity signal corresponding to the intensity of said modulated light beam, comparing said modulator output intensity signal with said video signal to provide a modulator intensity control signal, and utilizing said modulator intensity control signal to cause the intensity of said modulated light beam to correspond to said video signal; focusing said light beam on any light sensitive record medium coupled to said transport means; and deflecting said light beam in a transverse direction, in synchronism with the synchronization signal contained in said video signal, to generate a series of adjacent scan lines on said record medium corresponding to said printed image.

According to another aspect of the invention there is provided a method and apparatus for converting a received facsimile video signal containing a black phasing signal and a scan line synchronization signal to a printed image, comprising the steps of: providing an output light beam; providing a variable transmissivity filter in the path of said light beam; generating a laser intensity signal corresponding to the intensity of the output light beam of the laser at the output side of said filter; adjusting said filter to vary the transmittance of said light beam through said filter to compensate for variations in the intensity of the output light beam; moving a light sensitive record medium in a longitudinal direction; intensity modulating said light beam in accordance with the value of said video signal; focusing said light beam on any light sensitive record medium coupled to said transport means; and deflecting said light beam in a transverse direction, in synchronism with the synchronization signal contained in said video signal, to generate a series of adjacent scan lines on said record medium corresponding to said printed image.

According to another aspect of the invention there is provided a method and apparatus for converting a received facsimile video signal containing a scan line synchronization signal to a printed image, comprising the steps of: providing an output light beam; moving a light sensitive record medium in a longitudinal direction; intensity modulating said light beam in accordance with the value of said video signal; focusing said light beam to a point on any light sensitive record medium coupled to said transport means; deflecting said light beam in a transverse direction, in synchronism with the synchronization signal contained in said video signal, to generate a series of adjacent scan lines on said record medium corresponding to said printed image; and varying the focal point of said light beam in synchronism with the transverse deflection of said light beam along each of said scan lines, to maintain said light beam in focus on said record medium.

According to another aspect of the invention there is provided a method and apparatus for converting a received facsimile video signal to a printed image, said received video signal being amplitude modulated on a carrier signal and including a lineup interval preceding the video signal corresponding to a desired picture image level and a scan line synchronization signal, the amplitude of said carrier signal upon transmission of said received video signal to said receiver being originally constant during said lineup interval, the amplitude of said received carrier signal varying between successive half cycles due to D.C. offset occurring in the course of transmission or in said receiver, said method comprising the steps of: providing an output light beam; moving a light sensitive record medium in a longitudinal direction; generating a ramp signal during the lineup interval; combining the ramp signal with the received video signal to provide a composite signal having a D.C. level corresponding to the D.C. level of said received video signal shifted by an amount corresponding to the value of said ramp signal; rectifying and filtering said composite signal to provide a demodulated AM video signal; comparing the amplitude of said demodulated AM video signal at times corresponding to half cycle peaks of the carrier signal, with the amplitude of said demodulated AM video signal at times corresponding to adjacent half cycle peaks of said demodulated AM video signal, to provide a half cycle to half cycle difference signal; determining a ramp signal parameter corresponding to the minimum value of said half cycle to half cycle difference signal; causing the ramp generator, after said lineup interval, to provide to said AM signal combining means a D.C. level corresponding to said ramp signal parameter, so that said D.C. offset is substantially eliminated; intensity modulating said light beam in accordance with the value of said demodulated AM video signal; focusing said light beam on any light sensitive record medium coupled to said transport means; and deflecting said light beam in a transverse direction, in synchronism with the synchronization signal contained in said video signal, to generate a series of adjacent scan lines on said record medium corresponding to said printed image.

According to another aspect of the invention there is provided a method and apparatus for converting a received facsimile video signal to a desired printed image, said received video signal being frequency modulated on a carrier signal and including a lineup interval preceding the video signal corresponding to a desired picture image and a scan line synchronization signal, the frequency of said carrier signal upon transmission of said received video signal to said receiver being originally constant during said lineup interval, the duration of said received carrier signal varying between successive half cycles due to D.C. offset occurring in the course of transmission or in said receiver, said method comprising the steps of: providing an output light beam; moving a light sensitive record medium in a longitudinal direction; generating a ramp signal during the lineup interval; combining the ramp signal with the received video signal to provide a composite signal having a D.C. level corresponding to the D.C. level of said received video signal shifted by an amount corresponding to the value of said ramp signal; determining the durations of successive half cycles of said composite signal to provide a demodulated FM video signal; comparing the durations of said successive half cycles of said composite FM video signal with the durations of adjacent half cycles thereof, to provide a half cycle to half cycle difference signal; determining a ramp signal parameter corresponding to the minimum value of said half cycle to half cycle difference signal; causing the ramp generator, after said lineup interval, to provide to said FM signal combining means a D.C. level corresponding to said ramp signal parameter, so that said D.C. offset is substantially eliminated; demodulating said composite signal to provide a demodulated FM video signal; intensity modulating said light beam in accordance with the value of said demodulated FM video signal; focusing said light beam on any light sensitive record medium coupled to said transport means; and deflecting said light beam in a transverse direction, in synchronism with the synchronization signal contained in said video signal, to generate a series of adjacent scan lines on said record medium corresponding to said printed image.

According to another aspect of the invention there is provided a method and apparatus for converting a received facsimile video signal to a printed image, said received video signal being frequency modulated on a carrier signal, and including a lineup interval preceding the video signal corresponding to a desired picture image and a scan line synchronization signal, the frequency of said received video signal being constant during said lineup interval at a value corresponding to picture white, comprising the steps of: providing an output light beam; moving a light sensitive record medium in a longitudinal direction; demodulating said received video signal to provide an FM demodulated video signal; generating a ramp signal during the lineup interval; combining the ramp signal with the FM demodulated video signal to provide a demodulated FM composite video signal having a D.C. level corresponding to the D.C. level of said FM demodulated video signal shifted by an amount corresponding to the value of said ramp signal; converting said demodulated FM composite video signal to a corresponding demodulated FM composite digital video signal; comparing said demodulated FM composite digital video signal with a digital value corresponding to the desired digital value for picture white, and generating an offset level control signal when said digital value is equal to the digital value of said demodulated FM composite digital video signal; and providing a D.C. level corresponding to the D.C. value of said ramp signal at the time of occurrence of said offset level control signal, so that said FM composite digital video signal has said desired digital value when the D.C. level of said FM demodulated video signal corresponds to picture white; intensity modulating said light beam in accordance with the value of said demodulated FM composite digital video signal; focusing said light beam on any light sensitive record medium coupled to said transport means; and deflecting said light beam in a transverse direction, in synchronism with the synchronization signal contained in said video signal, to generate a series of adjacent scan lines on said record medium corresponding to said printed image.

According to another aspect of the invention there is provided a method and apparatus for converting a received facsimile video signal to a printed image, said received video signal being frequency modulated on a carrier signal and including a black phasing pulse having a frequency corresponding to picture black and a scan line synchronization signal, comprising the steps of: providing an output light beam; moving a light sensitive record medium in a longitudinal direction; demodulating said received video signal to provide an FM demodulated video signal; during the occurrence of said black phasing pulse, generating a transfer characteristic selection signal identifying that one of a plurality of value ranges into which the value of said FM demodulated video signal falls; expanding the dynamic range of said FM demodulated video signal according to a selected one of a corresponding plurality of transfer characteristics corresponding to said one value range, to provide an output FM demodulated video signal having a predetermined dynamic range; intensity modulating said light beam in accordance with the value of said output FM demodulated video signal; focusing said light beam on any light sensitive record medium coupled to said transport means; and deflecting said light beam in a transverse direction, in synchronism with the synchronization signal contained in said video signal, to generate a series of adjacent scan lines on said record medium corresponding to said printed image.

According to another aspect of the invention there is provided a method and apparatus for converting a received facsimile video signal containing a scan line synchronization signal to a printed image, comprising the steps of: providing an output light beam; moving a light sensitive record medium in a longitudinal direction; providing a dither control signal; intensity modulating said light beam in accordance with the value of said video signal; causing said light beam to dither in the longitudinal direction of said paper transport means with a spatial amplitude of dither corresponding to the value of said dither control signal; varying the value of said dither control signal to cause the spatial amplitude of dither to vary inversely with the value of said video signal; focusing said light beam on any light sensitive record medium coupled to said transport means; and deflecting said light beam in a transverse direction, in synchronism with the synchronization signal contained in said video signal, to generate a series of adjacent scan lines on said record medium corresponding to said printed image.

According to another aspect of the invention there is provided a method and apparatus for converting a received facsimile video signal containing a scan line synchronization signal to a printed image, comprising the steps of: providing an output light beam; moving a light sensitive record medium in a longitudinal direction; intensity modulating said light beam in accordance with the value of said video signal; modulating the intensity of said light beam with a train of pulses, the pulses of said train having a width varying in inverse relation to the value of said video signal, so that portions of said light beam of higher intensity have a shorter pulse duration than portions of said light beam of lower intensity; focusing said light beam on any light sensitive record medium coupled to said transport means; and deflecting said light beam in a transverse direction, in synchronism with the synchronization signal contained in said video signal, to generate a series of adjacent scan lines on said record medium corresponding to said printed image; whereby the tendency of portions of said printed image corresponding to higher intensity portions of said light beam to have a spot size on said record medium greater than the spot size of portions of said printed image corresponding to lower intensity portions of said light beam, is reduced.

In The Drawing

FIG. 2(b) is a diagram showing the relationship between laser beam energy and printed spot size;

FIG. 2(c) shows an actual printed spot and its enlargement due to the spatial energy distribution of the laser beam;

FIG. 2(f) shows the line structure of the printed image with and without the use of dither;

Figure 3A:
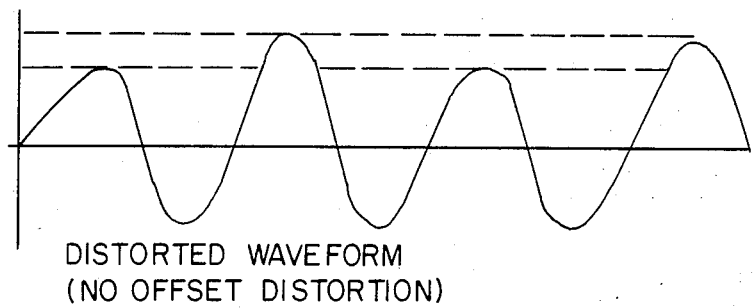
FIG. 3(a) shows a received AM or FM facsimile video signal prior to demodulated, wherein the signal corresponds to a constant image shade of gray (darkness or lightness) but has been distorted in the course of transmission and/or reception.
Figure 3B:
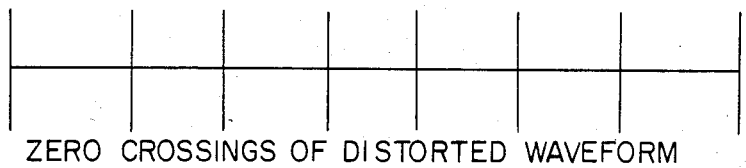
FIG. 3(b) shows the irregular zero crossovers of the signal of FIG. 3(a)
Figure 3C:
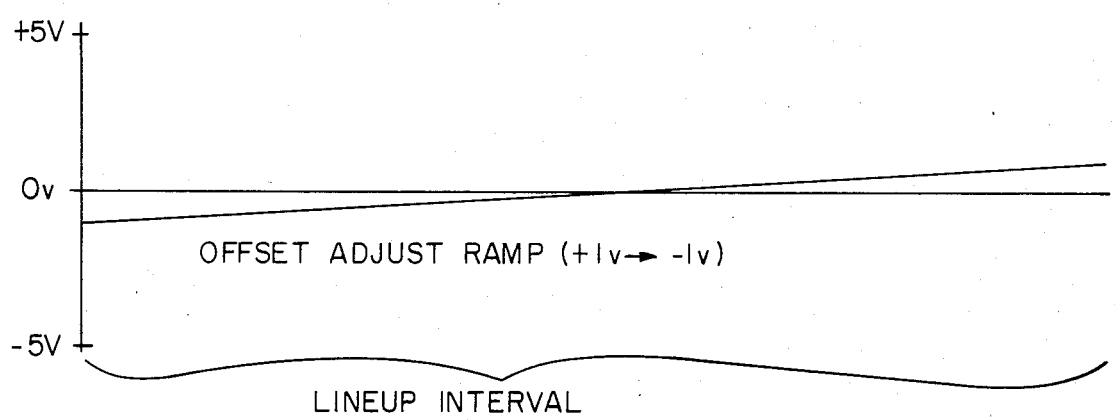
FIG. 3(c) shows an offset ramp signal generated in accordance with a feature of the present invention for the purpose of reducing AM amplitude irregularities or FM period irregularities in the received signal prior to demodulation thereof.
Figure 4A:
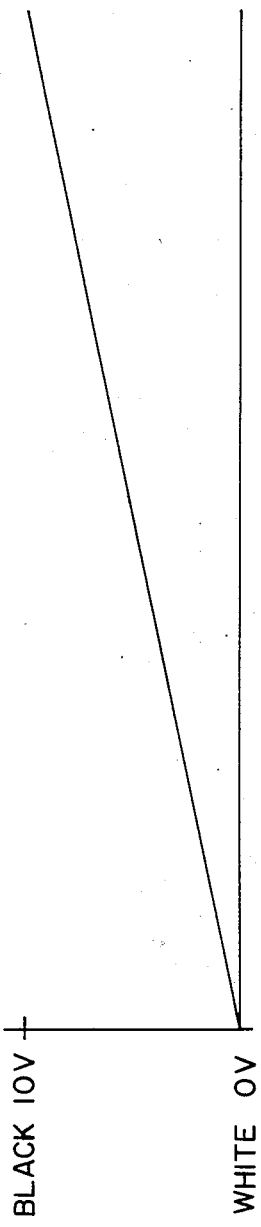
FIG. 4(a) shows a demodulated received signal having a time duration corresponding to 10 pels (picture elements), and varying linearly in amplitude from a value corresponding to white to a value corresponding to black between the first and last of the ten pels.
Figure 4B:
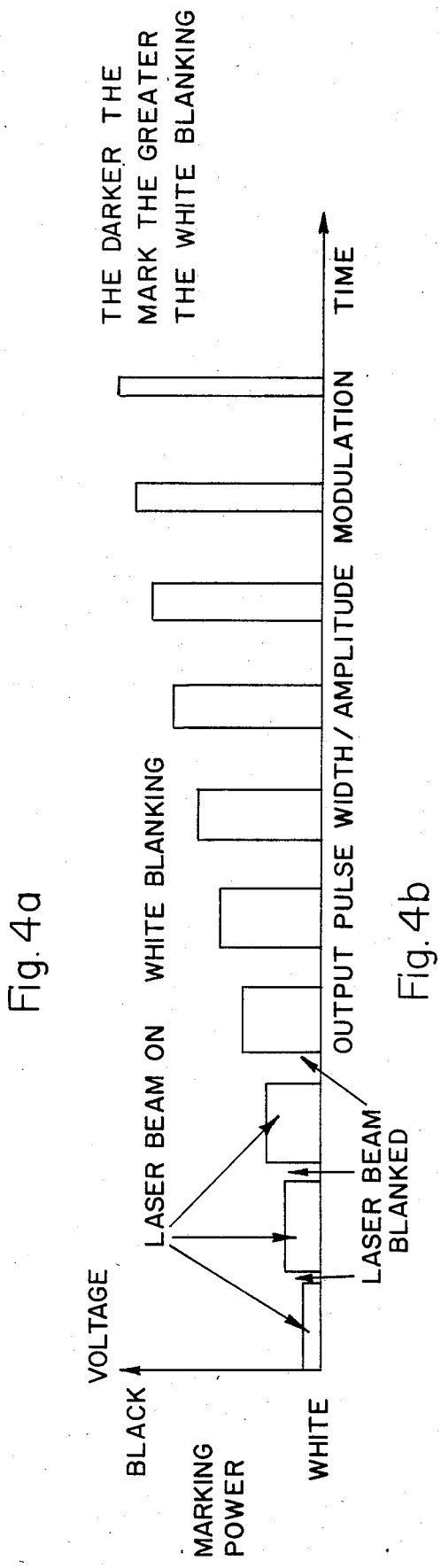
FIG. 4(b) is drawn to the same time base as FIG. 4(a), and illustrates the manner in which the spot size control arrangement according to a feature of the present invention reduces the "on" time of the laser beam for each pel as the pel becomes darker, i.e. as the intensity of the light beam impinging on the photosensitive printing paper increases.
Figure 4C:
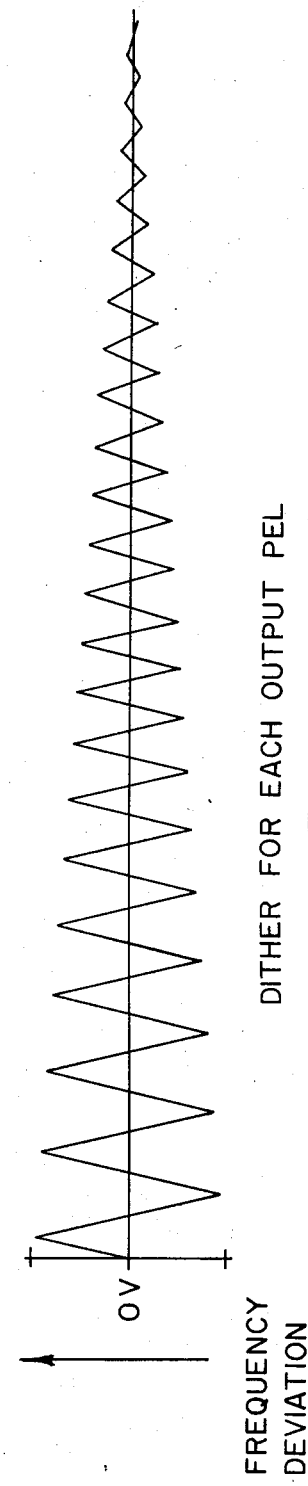
Figure 5:
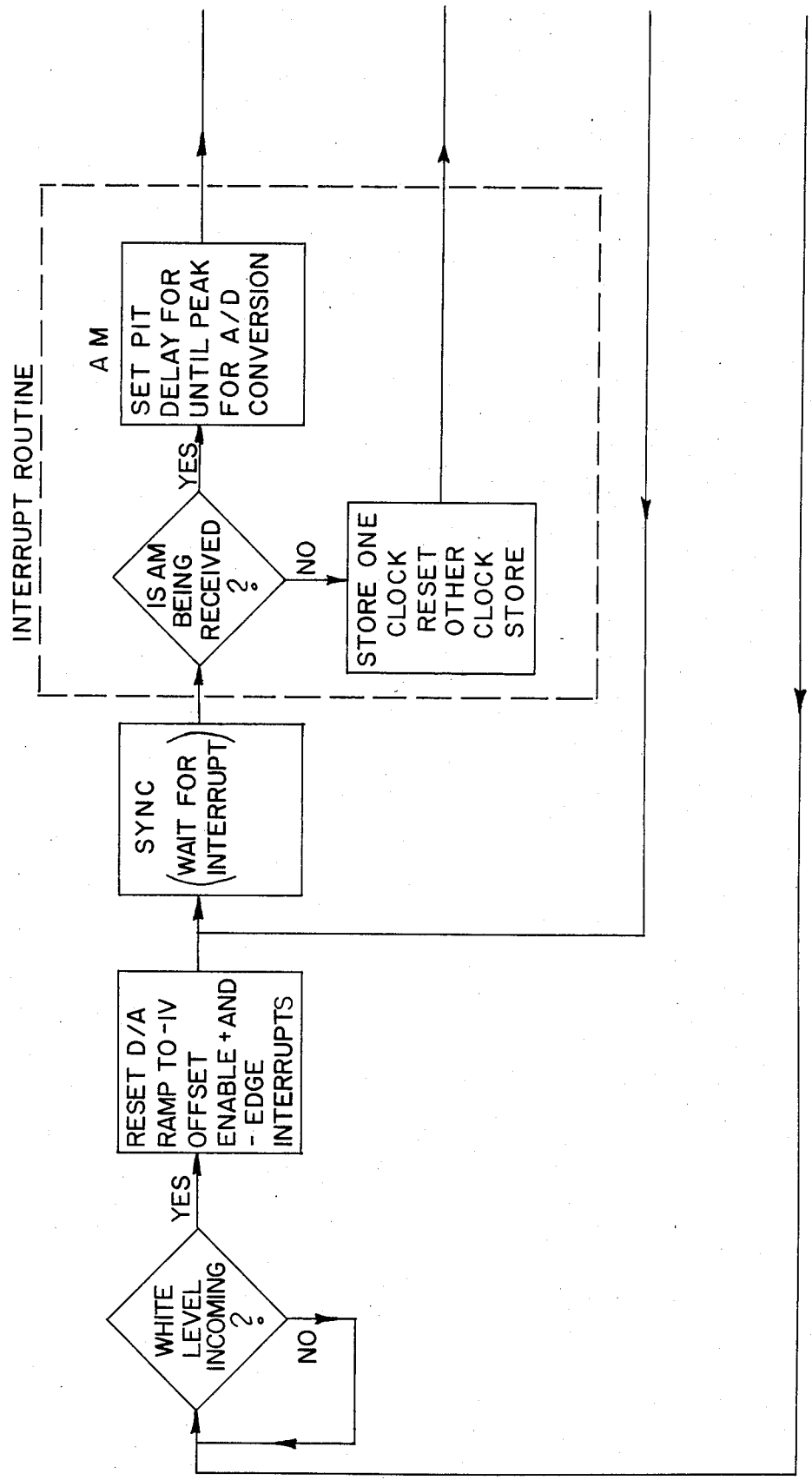
Figure 5:
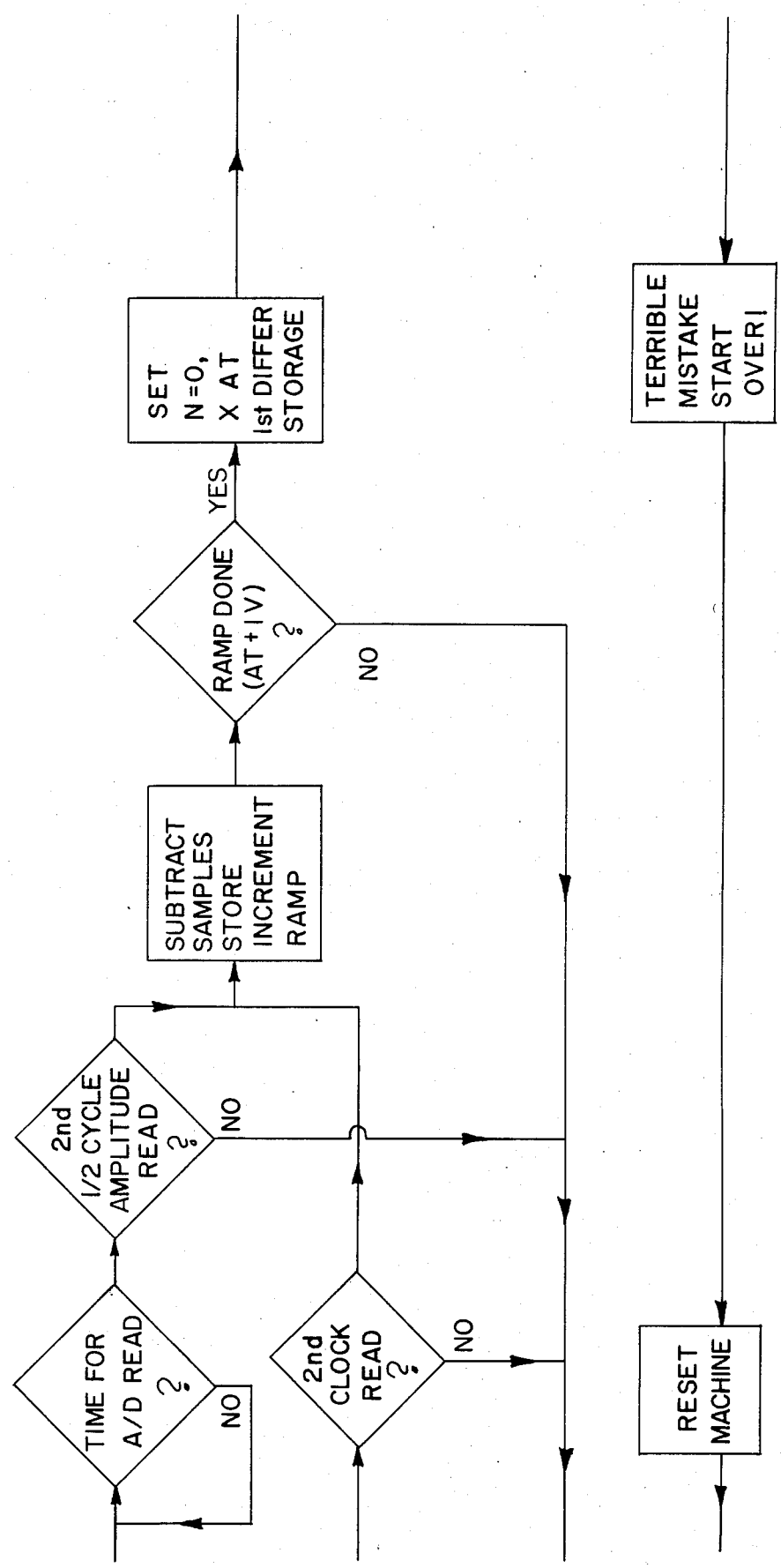
Figure 5:
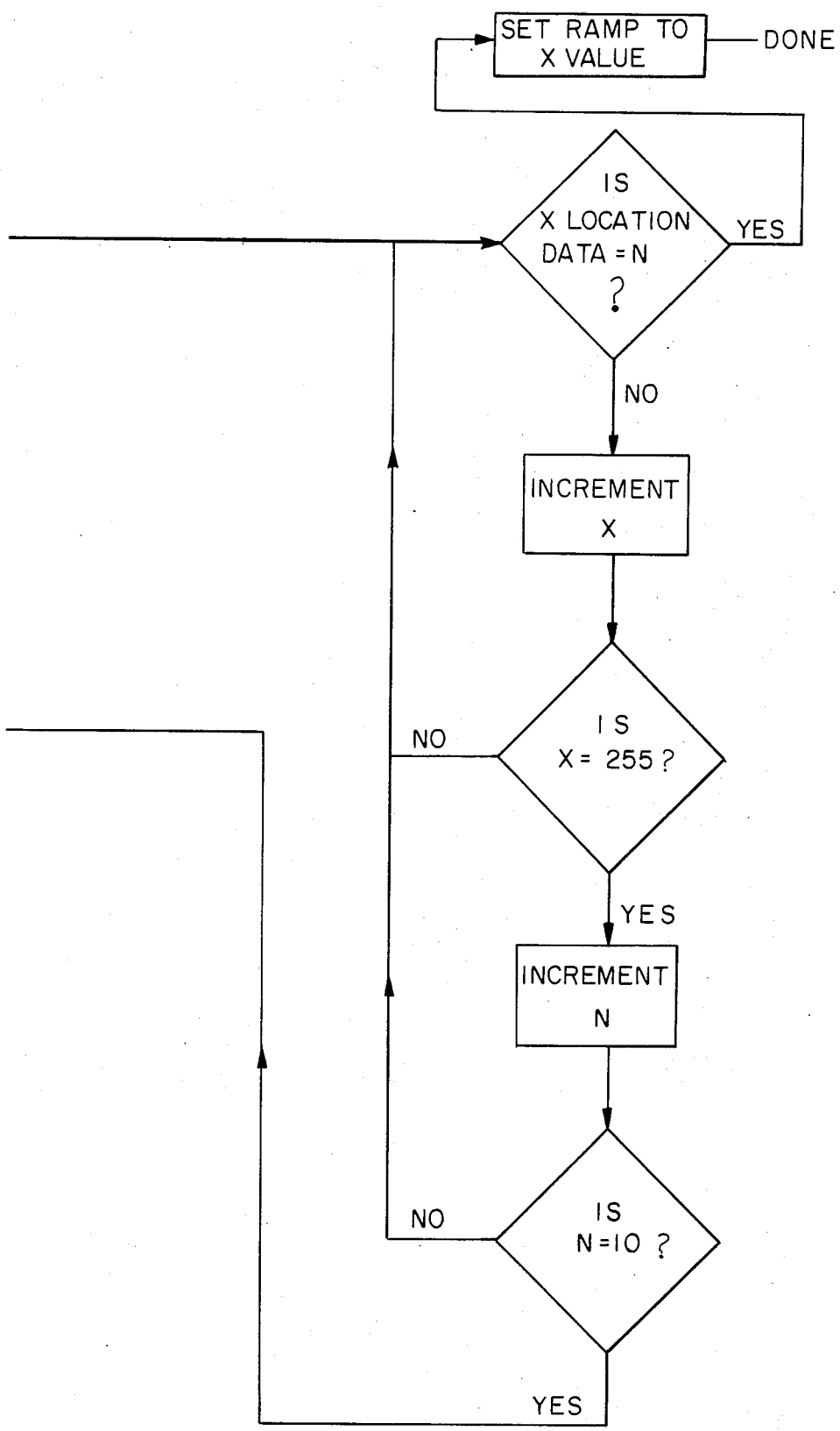
Figure 7:
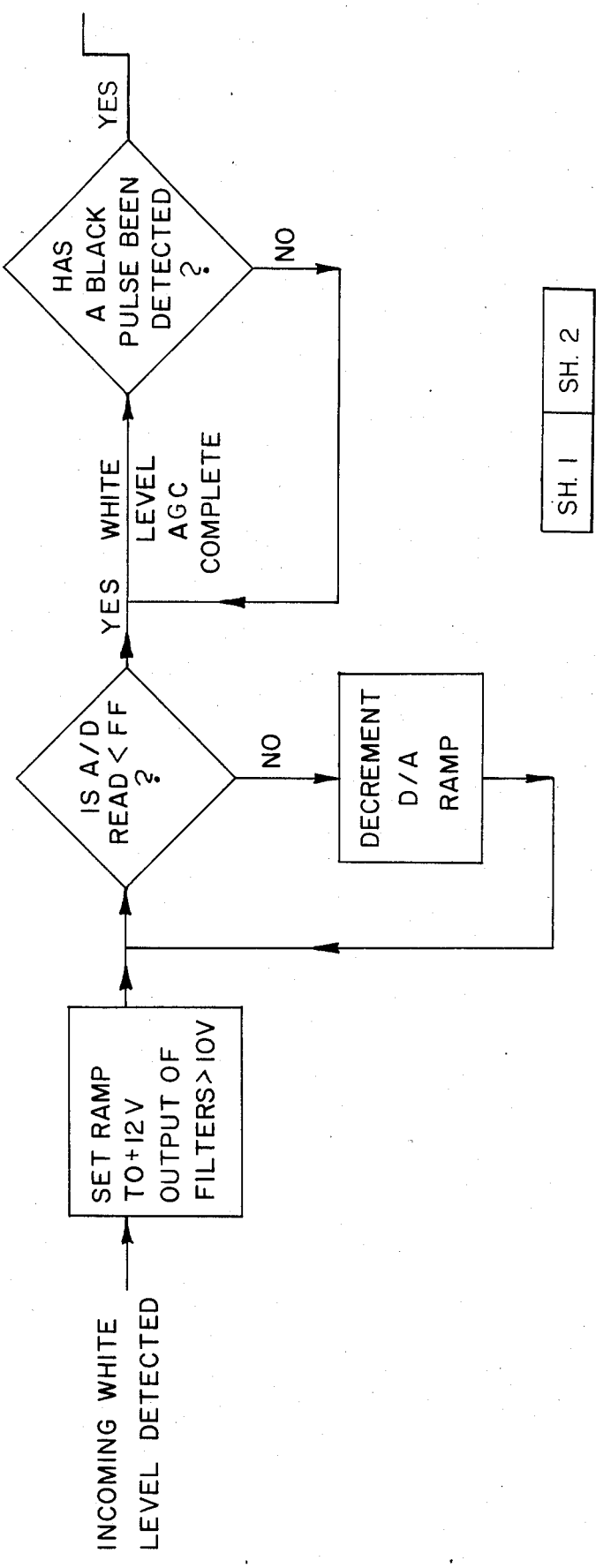
Figure 8:
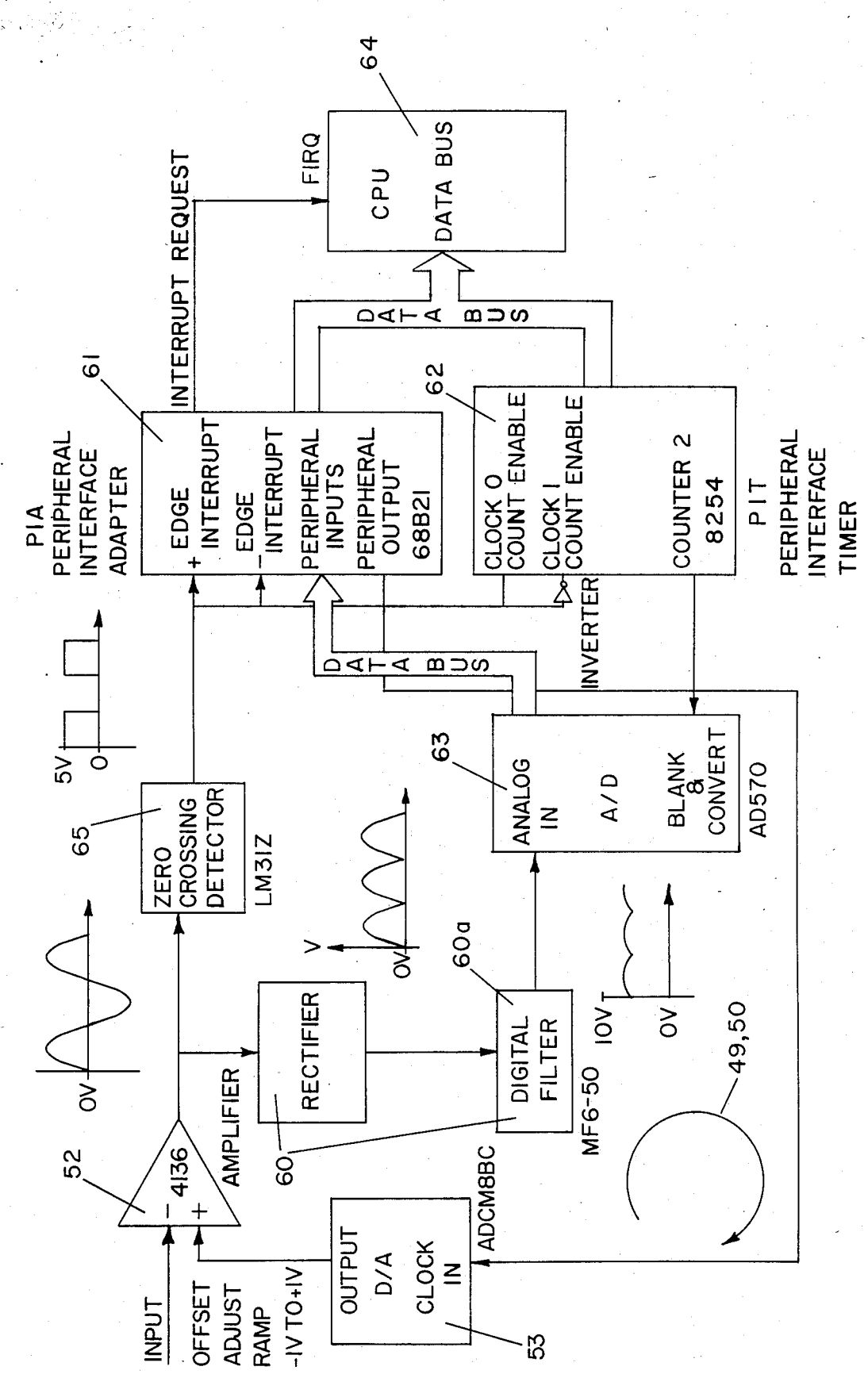
Figure 9:
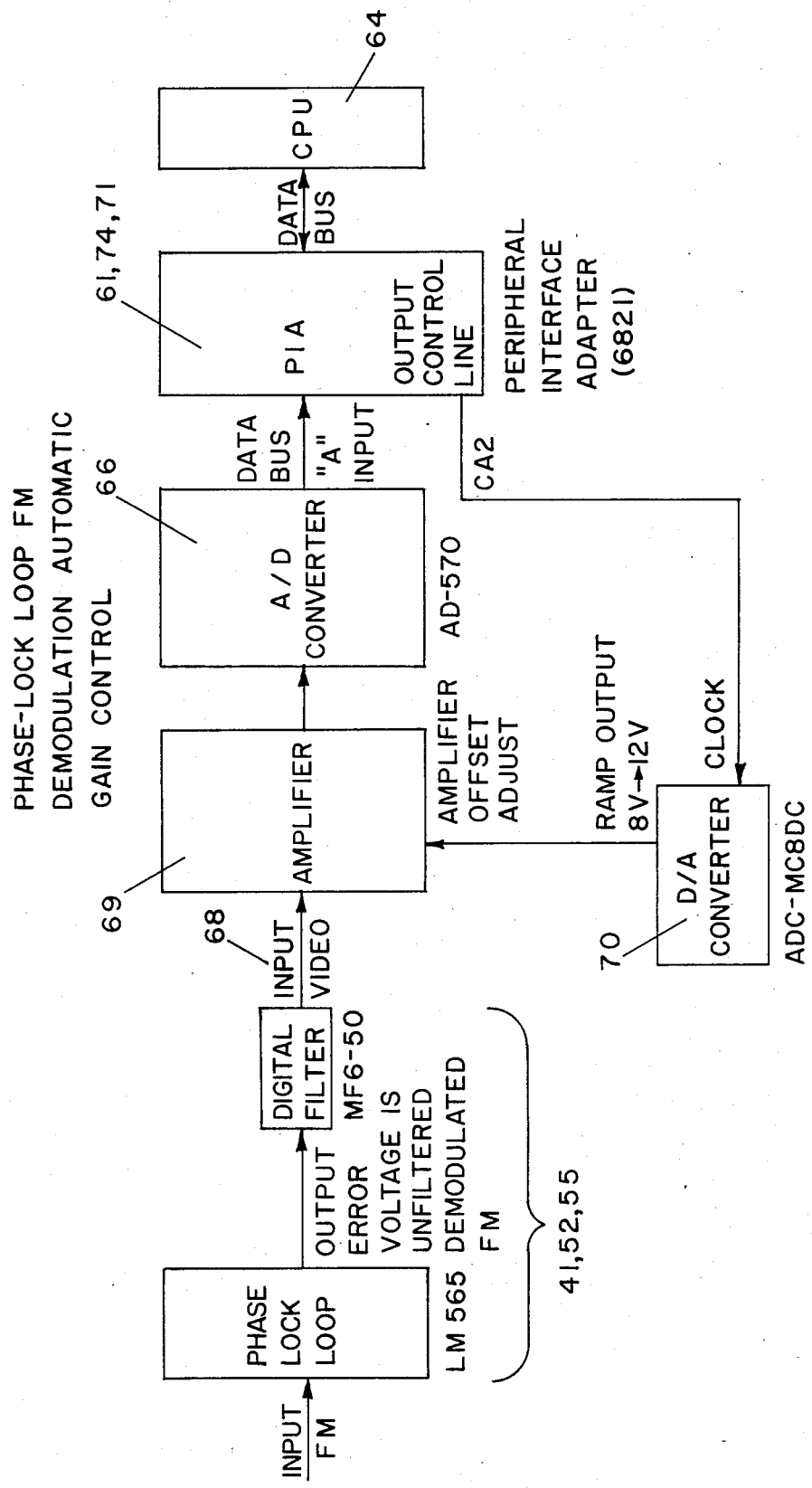

FIG. 4(c) is drawn to the same time base as FIGS. 4(a) and 4(b), and illustrates the manner in which the dither amplitude control arrangement according to a feature of the present invention causes the dither amplitude to decrease as the intensity of the light beam impinging on the photosensitive printing paper increases, so as to compensate for line spreading in the longitudinal (paper movement) direction due to increase in spot size as the light beam becomes brighter;

FIG. 5 is a flow chart showing the manner in which the ramp signal shown in FIG. 3(c) is employed during the lineup period at the beginning of the transmission of each image, to determine the optimum value of an offset signal to be combined with the received AM or FM video signal prior to demodulation thereof, so as to reduce ripple and noise in the demodulated video signal;

FIG. 6 shows the transfer characteristics of a scaling circuit for sealing the demodulated FM video signal to compensate for variations in receiver and demodulator characteristics so as to insure that the video signal range corresponds to substantially the entire dynamic range of the photosensitive printing paper;

FIG. 7 is a flow chart showing the manner in which the proper transfer characteristic table to be utilized by the scaling circuit is selected;

FIG. 8 is a block diagram of circuitry corresponding to the flow chart of FIG. 5, for generating the ramp shown in FIG. 3(c) during the lineup period at the beginning of the transmission of each image, for determining the optimum value of an offset signal to be combined with the received AM or FM video signal prior to demodulation thereof, and for "freezing" the ramp signal at a level corresponding to the desired offset signal;

FIG. 9 is a block diagram of an automatic offset control arrangement according to a feature of the present invention, for insuring that the maximum value of the demodulated FM signal corresponds to the upper limit of the range of the analog-to-digital converter the output of which feeds the aforementioned scaling circuit; and FIG. 10 is a block diagram showing a laser printing facsimile receiver according to a preferred embodiment of the invention.

DETAILED DESCRIPTION

System Description

The laser printing facsimile receiver according to a preferred embodiment of the present invention responds to facsimile video signals AM or FM modulated on a carrier in the audio frequency range, as well as video signals in digital form; the video signals corresponding to images to be reproduced. The video signal corresponding to each image includes an initial "lineup" interval during which the video signal value (e.g. amplitude or frequency) is constant and corresponds to a predetermined shade of gray of the image, usually white. The lineup interval is followed by one or more "black phasing" pulse intervals, each having a value which is constant and which corresponds to another shade of gray of the image, usually black. Line synchronizing signals included in the video signal identify the beginning of each scan line of the image. Circuitry for identifying the lineup and black phasing pulse intervals and the line synchronizing signals is well known in the art and will therefore not be described in this application.

The lineup and black phasing pulse intervals are followed by a video signal (punctuated by the line synchronizing signals) defining the shades of gray of the pels which make up the image, each pel having a duration corresponding to a half cycle of the carrier signal.

A laser beam from a 2 milliwatt helium-neon laser is intensity modulated by the video signal, and is transversely deflected by a rotatably reciprocating scan mirror so that the laser beam scans a longitudinally moving sheet of photosensitive dry silver paper in a series of parallel scan lines to print the image.

The laser beam is caused to oscillate ("dither") in the longitudinal direction at a frequency much higher than the maximum frequency of the video signal, and with a relatively small spatial amplitude on the order of the spacing between scan lines, so as to reduce scan line patterning in the printed image and thereby improve its perceived quality.

Principal features of the laser printing facsimile receiver are:

a Closed loop laser intensity modulation—The intensity of the modulated laser beam is compared with the video signal, and the difference signal is fed back to control the acousto-optical modulator which modulates the laser output. This control loop has a bandwidth equal to or greater than that of the video signal, so that the modulated laser beam accurately tracks variations in the video signal from pel to pel.

b. Automatic laser output intensity compensation—A neutral density optical filter in the optical path of the laser beam has varying optical transmissivity from one portion of the filter to another, so that the attenuation of the laser beam by the filter may be varied by rotating or otherwise moving the filter to place portions thereof having greater or lesser transmissivity in the path of the beam. The beam intensity at the output of the filter is measured during the occurrence of a black phasing pulse (corresponding to the darkest portion of the image and the highest intensity of the light beam projected on the printing paper) at the beginning of each image video signal and is compared to a black level reference signal, with the resulting difference signal fed back to control the filter to attenuate the laser beam so that the beam intensity corresponding to the desired black level is maintained constant independently of laser output changes due to aging and other factors. The filter range is such that a constant black output level is maintained over a laser power output range of 2 milliwatts to 0.2 milliwatts.

c. Dynamic focus during line scanning—The scan mirror causes the focal point of the optical system which focuses the laser beam to traverse a concave path with respect to the plane surface of the printing paper, so that the beam is normally in focus only at two points on the scan line, with the distance between the focal point of the beam and the paper surface varying sinusoidally (with the scan mirror deflection angle) between each end of the scan line and the center of the scan line. The focus lens which focuses the laser beam on the printing paper is driven through a sinusoidal cam linked to the rotational motion of the scan mirror, so that the focus lens is advanced furthest toward the paper at the ends of each scan line, and is retracted furthest away from the paper at the center of each scan line, to maintain the focal point of the beam on the paper surface throughout each scan line.

d. Automatic video signal bias level setting for ripple noise compensation—Undesired ripple and/or noise introduced into the AM or FM modulated video signal during transmission and/or reception is reduced by (i) combining the modulated video signal with a ramp signal during the (constant "white" modulation level) lineup interval, (ii) determining that instantaneous value of the ramp signal which (when combined with the modulated video signal) results in minimum pel-to-pel variation in the corresponding demodulated video signal and thus minimum ripple noise, and (iii) setting or "freezing" the ramp signal at the instantaneous value so determined, so that the constant "frozen" value of the ramp signal shifts or offsets the modulated video signal prior to demodulation, to reduce ripple/noise in the demodulated video signal during the succeeding image transmission.

e. Automatic offset level control of demodulated FM video signal—The bias or offset level of the demodulated FM video signal is automatically adjusted during the lineup interval, so that when the demodulated FM video signal is converted to digital form by an analog-to-digital converter, the lower or upper limit of the digital output value corresponds to the "white" level of the demodulated FM video signal, insuring usage of the full digital range available.

f. Automatic scaling of FM demodulated video signal—The value of the FM demodulated video signal corresponding to "black" is determined during the occurrence of a black phasing pulse, and a corresponding transfer characteristic is selected to scale the FM demodulated video signal so as to normalize the signal to compensate for variation in the FM discriminator slope, so that substantially the entire dynamic range of the printing paper may be utilized.

g. Automatic dither control—The frequency modulation of the dither signal is varied inversely with video signal amplitude (and thus with the modulated laser beam intensity), so that the spatial amplitude of dither is reduced as the video signal (and thus the modulated laser beam intensity) increases, to compensate for longitudinal spreading of portions of the scan lines exposed to relatively high intensity light beam levels.

h. Automatic spot size control—The video signal which drives the acousto-optical modulator is pulse width modulated so that the pulse width decreases as the video signal amplitude increases. Thus the light beam exposes the paper for a shorter time at high beam intensity levels than at low beam intensity levels, to maintain the beam energy approximately constant for each "spot" or "pel" printed on the printing paper, thus compensating for the increase in spot size which would otherwise occur at relatively high light beam intensity levels.

System Operation

Figure 1:
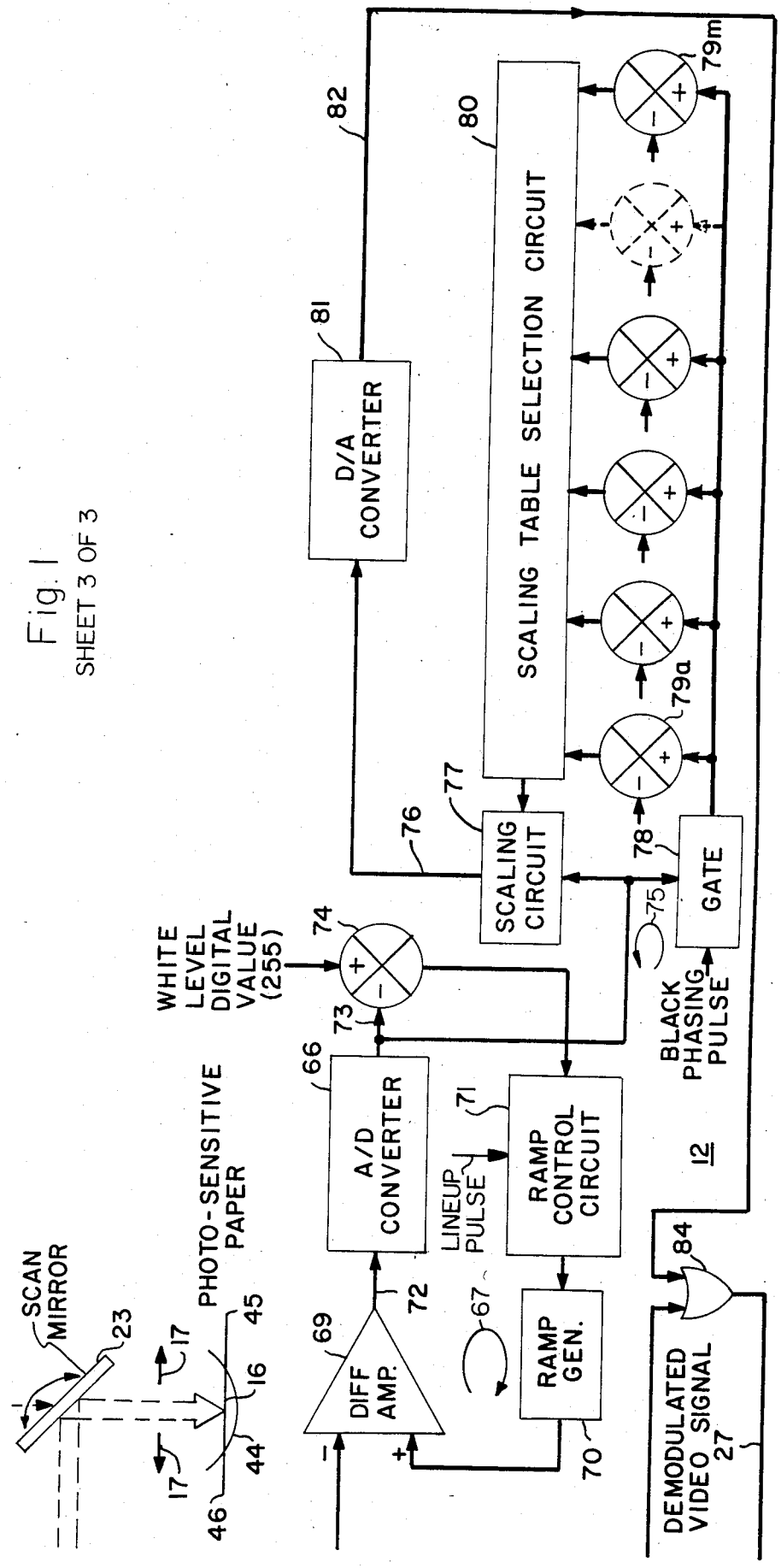
FIG. 1 is a functional block diagram of a laser printing facsimile receiver according to the present invention.

FIG. 1 shows a functional block diagram of a laser printing facsimile receiver 12 according to the present invention. This diagram is functional in nature, and each block of the diagram represents a function or functions performed. Some of these functions are performed by hardware. Other functions may be performed by analog circuitry, digital circuitry, and/or software programmed into a suitable microprocessor. In some cases, identical functions shown in separate blocks for purposes of clarity may actually be performed by a single shared analog, digital or software arrangement.

The optical path is designated by two parallel dashed lines, and originates with the optical output of a 2 milliwatt helium-neon laser 13, which is transmitted through an acoustooptical modulator 14.

The acousto-optical modulator 14 provides both intensity modulation and dither deflection of the laser beam. That is, the modulator 14 (i) modulates the intensity of the laser beam in accordance with the amplitude of a video signal applied to the modulator on line 15, and also (ii) deflects the laser beam with a spatial amplitude corresponding to the frequency of a dither signal which is also applied to the modulator on line 15. The optical path is set up so that the direction of dither is longitudinal of the dry silver photosensitive printing paper 16, i.e. in the direction of paper movement and perpendicular to the line scan direction indicated by the arrows 17.

The modulated and dithered output of the acousto-optical modulator 14 passes through a first beam splitter 18, with a small amount of the beam light being reflected to a photosensor 99 which monitors the intensity variations of the modulated laser beam.

Thereafter the laser beam passes through an optical focusing system including the reciprocating focus lens 19, which serves to provide dynamic focus of the light beam on the printing paper 16 by moving back and forth along the beam path as the beam traverses each scan line.

The light beam then passes through variable transmissivity neutral density filter 20, which is automatically adjusted to maintain a constant output intensity of the light beam corresponding to a "black" image on the paper 16, so as to compensate for changes in laser beam intensity due to aging and other effects.

The light beam exiting the filter 20 passes through a second beam splitter 21, with a small amount of the beam light being reflected to a photosensor 22 which is part of the control system for the setting of the transmissivity of the filter 20.

After passing through the beam splitter 21, the light beam is reflected from a rotatably reciprocating scan mirror 23 which is driven by a scan motor 24 to cause the light beam to scan the paper 16 in transverse lines in the direction indicated by the arrows 17. The motor 24 and scan mirror 23 may typically comprise a galvanometer movement.

When the focus lens 19 is stationary in a position relatively advanced along the light path toward the paper 16, the focal point of the light beam traverses a concave path indicated by the dashed line 44. The sinusoidal cam drive 25 sinusoidally reciprocates the focus lens 19 along the light path so that the focus lens is furthest retracted along the light path away from the paper 16 when the light beam is at the center of the scan, so as to maintain the focal point of the light beam on the surface of the paper 16 throughout each scan line.

The paper is moved longitudinally (either continuously or intermittently between line scans), i.e. in a direction perpendicular to the light beam and perpendicular to the direction of the transverse scan of each line by the mirror 23, by conventional paper transport means not shown in FIG. 1.

Closed Loop Laser Intensity Modulation

This feature is provided by the control loop designated by the arrow 26, and insures that the modulated optical output of the acousto-optical modulator 14 accurately "tracks" the video signal on line 27.

The modulated laser beam is sampled by the beam splitter 18 and the photosensor 19 provides an output signal on line 28 corresponding to the intensity of the light sample. The signals on lines 27 and 28 are subtracted from each other by the comparator 29, which provides a video error signal on line 30 to the acousto-optical modulator drive circuit 31. The acousto-optical modulator drive circuit 31 then drives the acousto-optical modulator 14 (through the gate 32) to reduce the error signal toward zero, i.e. to cause the intensity of the optical output of the acousto-optical modulator to correspond to the amplitude of the video signal on line 27. Thus the desired correlation between the optical output of the acousto-optical modulator and the video signal, and the desired modulation range, are maintained regardless of any nonlinearities or gain changes in the acoustooptical modulator 14 or its drive circuit 31.

Automatic Laser Output Intensity Compensation

This feature is provided by the control loop designated by the arrow 33, and insures that the peak level intensity level of the laser beam which exposes the printing paper 16 is maintained at a constant value corresponding to the desired "black" level as set by the value of the black reference signal on line 34.

The control loop 33 operates only during the occurrence of a black phasing pulse. One or more of such black phasing pulses occur following the lineup period near the beginning of the transmission of each facsimile image. When a black phasing pulse occurs the video signal on line 27 is at its highest amplitude or "black" level and causes the acousto-optical modulator 14 to provide minimum attenuation of the laser beam, so that the intensity of the laser beam at the output of the acousto-optical modulator 14 corresponds to the darkest, i.e. black level to be printed on the photosensitive paper 16.

At this time, i.e. the time of occurrence of a black phasing pulse, the control loop is enabled by application of the black phasing pulse to the gate 35. When the black phasing pulse is absent, the gate 35 blocks the output of the amplifier 36 from driving the variable transmissivity filter drive motor 37, so that the filter position does not change.

The response time of the control loop 33 is sufficiently rapid so that it can set the variable transmissivity filter 20 to the desired position within a time interval no greater than the duration of a single black phasing pulse. Alternatively, a simulated black phasing pulse of greater duration than the response time of the control loop 33 may be provided to gate 35 and on video signal line 27 for the purpose of setting the filter 20 to the correct optical attenuation.

Beam splitter 21 samples the light beam which passes through the variable transmissivity filter 20, and a signal corresponding to the intensity of this light beam is provided by the photosensor 22 on line 38.

When a black phasing pulse is present, gate 35 enables the output of amplifier 36 to drive filter motor 37 to rotate the variable transmissivity filter 20 to a position attenuating the light beam to an extent such that the output of photosensor 22 on line 38 is equal to the black reference signal on line 34, as determined by the comparator 43; i.e., so that the peak intensity of the light beam impinging on the beam splitter 21 is maintained at a constant value corresponding to the desired darkness of the darkest portion of the image to be printed on the paper 16.

Thus the peak intensity level of the light beam impinging on the paper 16 is maintained at a constant level independently of variations in the optical power output of the laser 14 and other changes in the optical system between the laser 14 and the beam splitter 21.

When the laser output is so low that even with the filter 20 set for minimum light attenuation (i.e., the clear portion of the filter being in the light path as determined by the filter position sensor 47) the output level of the photosensor 22 on line 38 is less than the desired reference value on line 34 as determined by the comparator 43, the warning circuit 48 illuminates a light indicating that the laser 13 must be serviced or replaced.

Dynamic Focus During Line Scanning

The optical system for focusing the laser beam on the printing paper 16 comprises two or more lenses, one of which is movable back and forth along the optical path to vary the location of the focal point of the optical system. For purposes of clarity only the movable focus lens 19 is shown in FIG. 1.

The scanning galvanometer (or scan motor) 24 is driven by galvanometer (or motor) drive logic circuit 39, which receives line synchronization pulses from the receiver 41. The galvanometer drive logic circuit 39 is of conventional design, and drives the scan motor 24 (which is preferably a galvanometer) in synchronization with the video signal, so that the light beam is positioned at the beginning of a scan line on the paper 16 and starts to scan the line when the video signal on line 27 corresponds to the image at the beginning of said scan line.

Figure 2A:
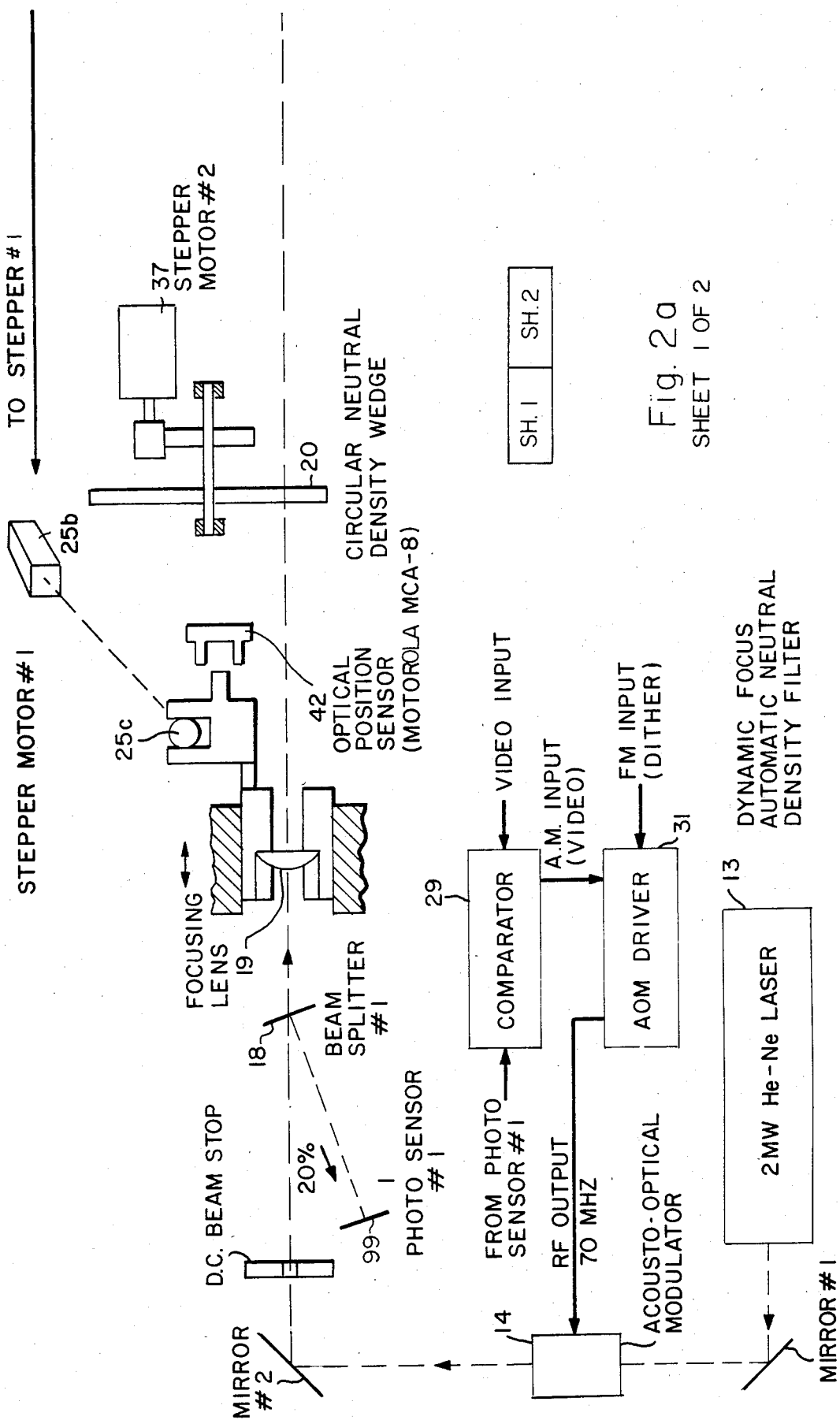
FIG. 2(a) is a functional block/mechanical schematic diagram showing some details of the dynamic focus control loop and the laser beam intensity control loop according to features of the present invention.
Figure 2A:
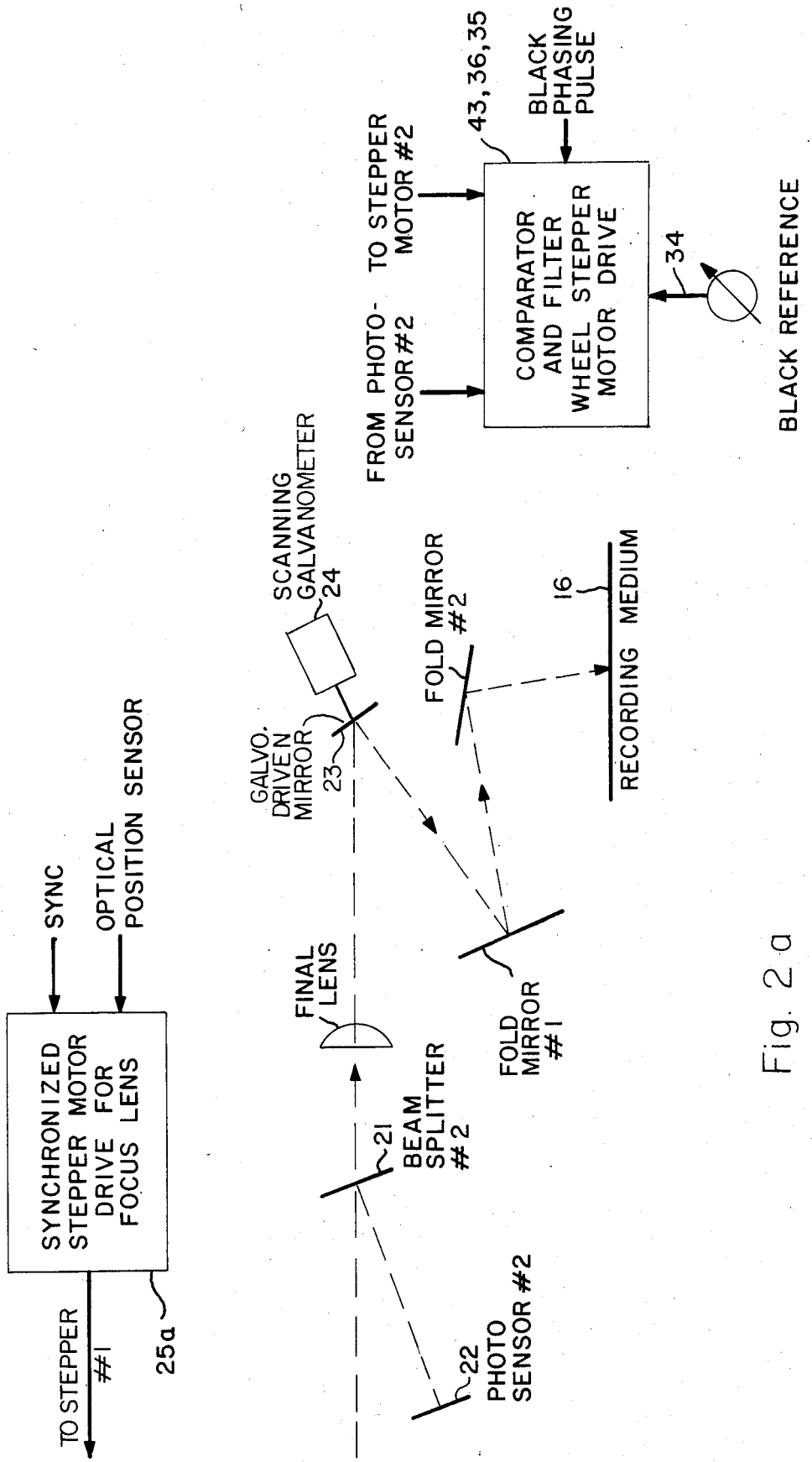

In similar fashion, the cam drive circuit/cam drive motor 25 (consisting of the synchronized stepper motor drive 25a, the stepper motor 25b, and the cam arrangement 25c shown in FIG. 2(a)) receives a focus lens position signal from the focus lens position sensor 42 and line synchronization pulses from receiver 41, and drives the focus lens 19 through a sinusoidal cam (preferably an eccentrically mounted circular disk) so that the focus lens 19 (i) is advanced toward the image plane coinciding with the surface of the printing paper 16 at the starting end 45 and the finishing end 46 of each scan line, and (ii) is retracted the maximum distance away from the image plane at the center of the scan line.

Prior to providing this arrangement, the focal point of the light beam, when set up to be on the paper surface at the scan line ends 45 and 46, was about 7 millimeters below the paper surface at the center of the scan line, resulting in a substantially defocused spot at the scan line center and a somewhat lesser extent of defocus between the center and the ends of the scan line.

With this dynamic focus arrangement, however, the spot size on the paper 16 (as measured between points on the spot having an intensity equal to 50% of the peak intensity of the spot) was maintained within 2.5% of its desired value. The corresponding range of motion of the focus lens 19 was 0.024 inches.

In the preferred embodiment the stepper motor 25b (FIG. 2(a)) requires 48 drive pulses to cause the focus lens 19 (via the cam arrangement 25c) to complete one cycle, i.e. from the advanced position corresponding to the beginning of a scan line to the retracted position at the center of the scan line and back to the advanced position at the end of the scan line/beginning of the next scan line. These 48 pulses are provided by the cam drive logic circuit 25a (FIG. 2(a)) each time a line synchronization pulse is received.

The position of the focus lens 19 relative to the scan mirror 23 is initialized at the beginning of each image transmission.

Automatic Video Signal Bias Level Setting For Ripple/Noise Compensation

The use of automatic bias level setting for ripple/noise compensation of FM video signals is achieved by the arrangement identified by the control loop 49; and the use thereof for such compensation of AM video signals is achieved by the arrangement identified by the control loop 50. Waveforms which help in understanding the operation of this compensation arrangement appear in FIGS. 3(a) through 3(g). FIG. 1 includes a functional block diagram of the arrangement, while FIG. 8 shows a block diagram of the integrated circuits and other components which may preferably be employed to realize the arrangement; and FIG. 5 is a flow chart applicable to the block diagram of FIG. 8.

In the preferred embodiment shown in FIG. 8, waveform corrections are achieved by microprocessor controlled D.C. offset. This offset control can minimize the difference in successive half cycles of the FM or AM modulated signal waveform. These differences are compensated for during the picture lineup interval which precedes the transmission of the picture image. During the lineup interval a certain frequency (FM) or a certain amplitude (AM) representing picture white is transmitted to the receiver. This signal is constant, meaning that for FM successive zero crossings are equi-spaced; and that for AM successive half cycles have equal amplitude.

In actual practice these ideals are seldom realized. There are many reasons for the deviation of the FM and AM waveforms from uniformity. Some causes are due to distortions which occur within the receiver-demodulator (such as an unbalanced rectifier characteristic), while some causes (such as line distortion) are external to the facsimile receiver. The arrangement described below is designed to measure the deviations of the waveforms from uniformity and to compensate for those deviations which correspond to a D.C. offset of the video signal.

During the lineup interval of the incoming AM or FM modulated video signal transmitted from a remote facsimile transmitter to the receiver 41 on line 51, the amplitude and period of the signal carrier are nominally constant and usually correspond to the image "white" level (each half cycle representing a pel of the image). However, in practice ripple and noise cause distortions in the amplitude and period of the carrier of the modulated video signal.

According to a feature of the present invention, these signal distortions can be reduced by adding a proper value of DC bias to the incoming modulated video signal prior to signal demodulation. The proper value of DC bias is determined during the lineup interval which precedes each image transmission and is utilized for demodulation of the image transmission that follows.

During the lineup interval a varying DC level (i.e. a ramp signal) is combined with the "white" modulated video signal. The combined signal is then demodulated and a determination is made as to the (D.C. level) value of the ramp signal which corresponds to minimum variation in the (nominally constant) demodulated video signal, i.e. minimum ripple/noise. A D.C. level corresponding to the value of the ramp signal so determined is then combined with the modulated video signal for the duration of the following image transmission, so that after demodulation the ripple/noise content of the video signal is minimized.

Figure 3D:
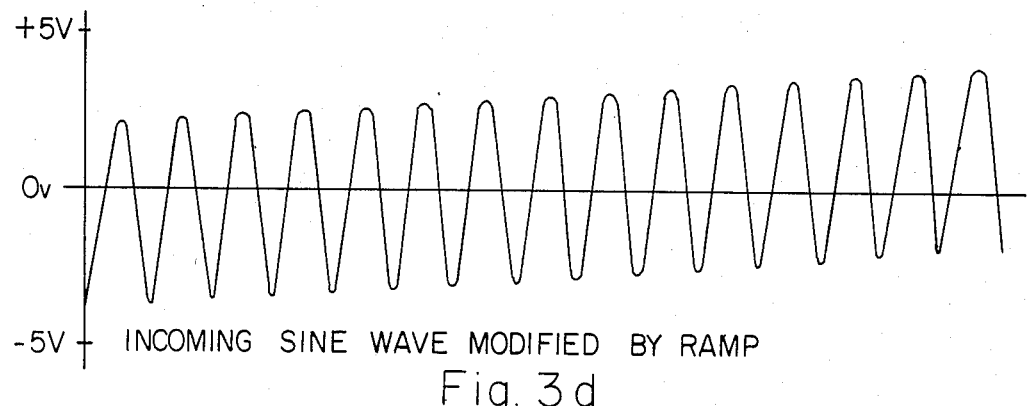
FIG. 3(d) shows the signal of FIG. 3(a) to a different time base, after being combined with the ramp of FIG. 3(c)
Figure 3E:
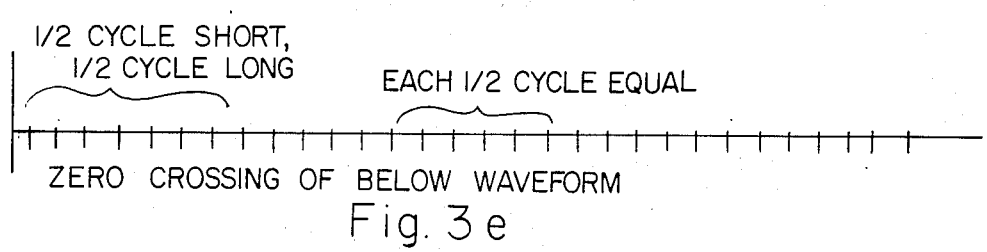
FIG. 3(e) is drawn to the same time base as FIG. 3(d), and shows the zero crossovers of the signal of FIG. 3(d)

As shown in FIGS. 3(a) through 3(g), the initially distorted AM or FM modulated video signal of FIG. 3(a), with zero crossovers as shown in FIG. 3(b), is combined with the ramp signal shown in FIG. 3(c) to yield a waveform as shown in FIG. 3(d) with zero crossovers as shown in FIG. 3(e).

As seen in FIGS. 3(d) and 3(e), from an FM standpoint the composite waveform exhibits (i) alternate short and long half cycles at the beginning of the lineup interval, (ii) half cycles of essentially equal duration in a middle range of the lineup interval, and (iii) alternate long and short half cycles at the end of the lineup interval. From an AM standpoint the composite waveform exhibits (i) alternate high and low amplitude half cycles at the beginning of the lineup interval, (ii) half cycles of essentially equal amplitude in a middle range of the lineup interval, and (iii) alternate low and high amplitude half cycles at the end of the lineup interval.

Figure 3F:
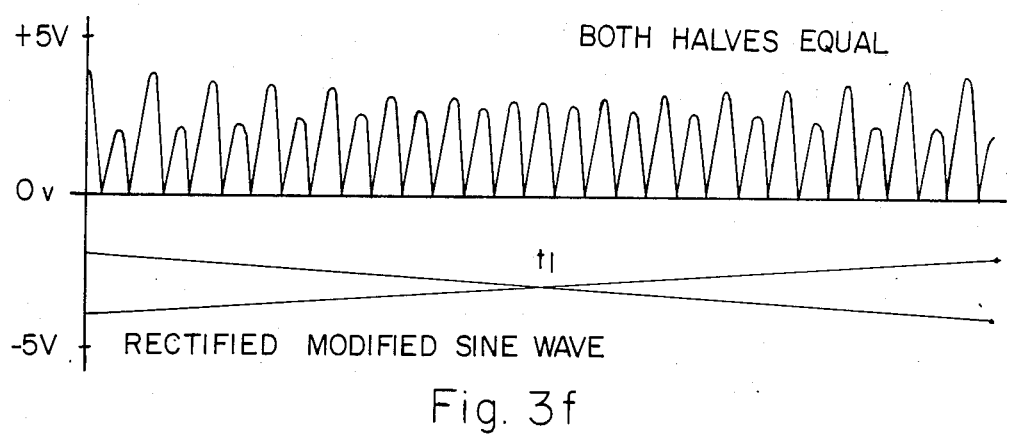
FIG. 3(f) shows the signal of FIG. 3(d) after full wave rectification thereof.
Figure 3G:
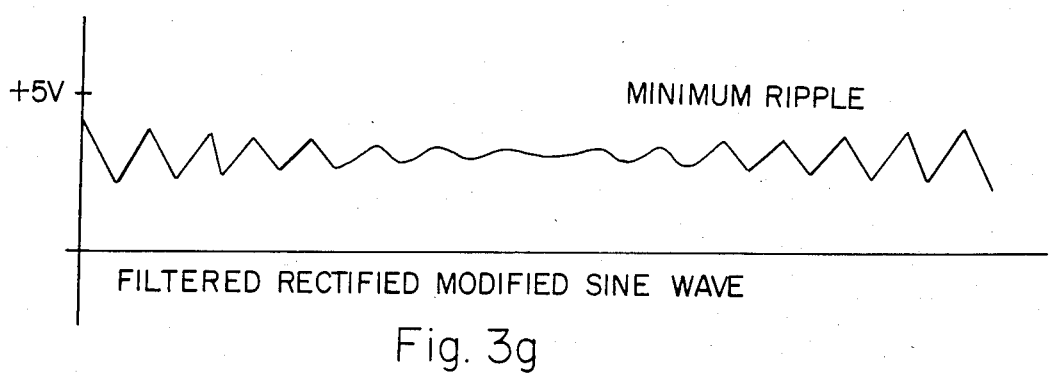
FIG. 3(g) shows the AM demodulated signal of FIG. 3(f) after filtering thereof-the filter range being selected so as not to interfere with the bandwith of the received signal.

The full wave rectified composite AM video signal during the lineup period is shown in FIG. 3(f), from which it is evident that the value of the ramp signal at time $t_1$ is such that adjacent half cycles are equal, so that after filtering a constant "white" level video signal would be obtained, as shown in FIG. 3(g). In the absence of ripple and noise the value of the ramp signal at time $t_1$ would be zero; however, in the presence of ripple or noise a non-zero value of the ramp signal would correspond to the time $t_1$ at which successive half cycles of the rectified AM waveform are of substantially equal amplitude. By applying this non-zero value of the ramp signal as a D.C. level combined with the modulated AM video signal, ripple and noise in the demodulated video signal are minimized.

Similarly, in the absence of ripple and noise the value of the ramp signal at a time when the durations of successive half cycles are equal would be zero; and in the presence of ripple or noise a non-zero value of the ramp signal would correspond to the time at which successive half cycles of the demodulated FM waveform are of equal duration. By applying this non-zero value of the ramp signal as a D.C. level combined with the modulated FM video signal, ripple and noise in the demodulated video signal are minimized.

In FM video signal processing this arrangement has a dual benefit. Often it is not only DC bias level offset which causes FM half cycle inequality but distortions in the carrier wave itself. Such waveform distortions change the zero crossings of the FM signal in much the same way as bias level offset distortion and are also minimized by the use of the bias level compensation arrangement of the present invention.

Thus the arrangement identified by the control loops 49 and 50 compensates for D.C. offset of the modulated video signal, which nominally has a zero D.C. bias level.

The receiver 41 is of conventional design, and in known manner employs a phase lock loop and other circuitry to provide (i) clock pulses synchronous with the carrier, (ii) a lineup pulse defining the lineup interval during which the video signal corresponds to "white", (iii) two or more black phasing pulses during which the video signal corresponds to "black", and (iv) line synchronization pulses identifying the beginning of each scan line.

The modulated FM signal output of the receiver 41 is coupled to an input terminal of a differential amplifier 52. The other input of the amplifier 52 is coupled to the output of ramp generator 53, and the composite output signal on line 54 is coupled to a demodulator/discriminator in the form of a zero crossover interval measurement circuit 55. The circuit 55 provides an output signal having a value corresponding to the time interval between successive zero crossovers of the composite waveform on line 54.

The output of the zero crossover interval measurement circuit 55 is coupled to the comparator 56 (i) directly and (ii) through a 1 pel or one carrier half cycle delay circuit 57, so that the output of the comparator 56 corresponds to the difference in duration between successive half cycles of the composite waveform on line 54.

The minimum value determination circuit 58 (which may be a suitably programmed microprocessor) determines the time of occurrence of the minimum value of the output of the comparator 56, i.e. the time at which the difference in duration between successive half cycles of the composite waveform is a minimum. This determination can be made by converting the output of the comparator 56 to digital form, and employing a suitably programmed microprocessor responsive to the clock pulses from the receiver 41 and to the (digitally converted) comparator output to store corresponding samples (taken at half cycle, i.e. pel intervals) of the comparator output and to scan the samples to determine the time of occurrence of the sample having minimum value; or if there is more than one sample having minimum value, the mean time of occurrence about which the minimum value samples are distributed. Such minimum value determining techniques are well known in the art and are therefore not described in further detail here.

The ramp generator 53 is controlled by the ramp control circuit 59. During the lineup period the ramp control circuit 59 causes the ramp generator 53 to generate the ramp shown in FIG. 3(c). At the end of the lineup period the ramp control circuit 59 receives a signal from the minimum value determination circuit 58 indicating the time $t_1$ of the lineup period (see FIG. 3(f), for example) at which ripple and noise were minimal. The ramp control circuit 59 (which may be a suitably programmed microprocessor) determines the value of the D.C. level which the ramp signal had at time $t_1$, and sets or "freezes" the output of the ramp generator 53 at this D.C. level for the duration of the image transmission which follows the lineup period.

The ramp generator 53 may, for example, be a digital to analog converter, and the ramp control circuit 59 may include a counter which counts the clock pulses from the receiver 41 during the lineup period, the count of the counter being set to a value corresponding to the count at time $t_1$ in response to the output of the minimum value determination circuit 58.

The AM control loop 50 operates in the same manner as the FM control loop 49, except that an AM demodulator comprising rectifier and filter 60 replaces the FM demodulator/discriminator comprising zero crossover interval measurement circuit 55. The AM loop operates to provide a D.C. bias level signal which results in minimum amplitude variation between successive half cycles of the carrier signal due to ripple or noise. Elements 52a, 57a, 56a, 58a, 59a and 53a are identical to and perform the same functions as corresponding elements 52, 57, 56, 58, 59 and 53 respectively. Since FM and AM video signals are not received simultaneously, common elements can employed to alternately serve in the FM and AM loops.

In the block diagram of FIG. 8, a number of the functions of the control loops 49 and 50 are provided by the central processor unit ("CPU") 64, peripheral interface adapter ("PIA") 61, peripheral interval timer ("PIT") or counter 62, and analog-to-digital converter 63. The PIA is a commercially available Motorola Model 68B21 integrated circuit for interfacing the CPU 64 to peripheral equipment and circuitry. The PIT 62 may be a commercially available Intel Model 8254 integrated circuit. The zero crossing detector 65 may be a commercially available Model LM 322 integrated circuit. The analog-to-digital converter 63 may be a commercially available Analog Devices Model AD 570 integrated circuit. The digital filter 60a may be a commercially available Model MF6-50 integrated circuit. The digital-to-analog converter 53 may be a commercially available Analog Devices Model ADC M8BC integrated circuit.

As shown in FIG. 10, the central processor unit or CPU 64 has two coprocessors, namely (i) a commercially available Motorola Model 6809 microprocessor unit ("MPU") 64a, and (ii) a commercially available Motorola Model 6809E MPU 64b. In addition, the CPU 64 has two erasable read-only memories ("EPROM"s) 64c and 64d, and a 16 kilobyte capacity shared random-access memory ("RAM") 64e.

The assembly language programs for the MPUs 64a and 64b are appended to this specification.

The PIA pin connections are as follows:

| Pin | Function | Pin | Function |
| --- | --- | --- | --- |
| 1 | VSS | 21 | R/W |
| 2 | PA0 | 22 | CS0 |
| 3 | PA1 | 23 | CS2 |
| 4 | PA2 | 24 | CS1 |
| 5 | PA3 | 25 | E |
| 6 | PA4 | 26 | D7 |
| 7 | PA5 | 27 | D6 |
| 8 | PA6 | 28 | D5 |
| 9 | PA7 | 29 | D4 |
| 10 | PB0 | 30 | D3 |
| 11 | PB1 | 31 | D2 |
| 12 | PB2 | 32 | D1 |
| 13 | PB3 | 33 | D0 |
| 14 | PB4 | 34 | RESET |
| 15 | PB5 | 35 | RS1 |
| 16 | PB6 | 36 | RS0 |
| 17 | PB7 | 37 | IRQB |
| 18 | CB1 | 38 | IRQA |
| 19 | CB2 | 39 | CA2 |
| 20 | VCC | 40 | CA1 |

The PIA 61 address lines RS0 and RS1 allow the processor 64 to access four addresses. These include control registers whereby different lines can be configured to match circuit needs. Lines PA0–PA7 and PB0–PB7 are two separate data busses which can be configured as inputs or outputs. In addition, each line can be configured as an input or output individually. In addition, the control lines CA0, CA1, CB0 and CB1 can be configured as inputs or outputs and either plus or minus edge interrupt requests. In FIG. 8 CA0 is configured to request an interrupt on line IRQA when it sees a minus edge; and CA1 is configured to request an interrupt on line IRQA when it sees a positive edge.

In the arrangement shown in the block diagram of FIG. 8, the FM or AM modulated video signal is applied as an input to the negative input terminal of differential amplifier 52. The positive input terminal of amplifier 52 is connected to the output of a digital-to-analog converter which acts as ramp generator 53. The output of ramp generator 53 varies from −1 volt to +1 volt, and offsets the output of amplifier 52 from −1 volt to +1 volt.

The sine wave output of amplifer 52 is coupled to the input of zero crossing detector 65 (for FM compensation) and to rectifier/digital filter 60 (for AM compensation). The zero crossing detector 65 changes the sine wave composite FM modulated video signal into a pulse train which has a leading or trailing pulse edge at each sine wave zero-crossing point. The pulse train is applied to two interrupt control lines of the PIA 61.

As previously mentioned, one interrupt control line is configured for a positive edge interrupt and the other interrupt control line is configured for a negative edge interrupt. This means that while they are enabled, the control lines cause an interrupt request every positive and negative edge of the incoming pulse train from the zero crossover detector 65, i.e. every half cycle of the modulation carrier.

The output of zero crossover detector 65 is also connected to one gate of PIT 62 directly, and to another gate of PIT 62 through an inverter. These PIT gates enable the PIT 62 internal clocks 0 and 1 respectively. Due to the inverter, one internal clock will be counting while the other internal clock is halted, and vise versa.

During the fast interrupt request ("FIRQ") routine generated by PIA 61, the CPU 64 monitors each of the PIA 61 internal clocks. Thus the duration of each half cycle of the pulse train is measured and its value is stored by the CPU 64.

During the lineup interval, CPU 64 measures the frequency of the modulated video signal and, by determining the frequency, determines whether the modulated video signal must be an FM or an AM signal—as the standard FM and AM carrier frequencies are different from each other.

During the lineup interval the CPU 64 (coupled to the converter 53 through the PIA 61) counts up to 255, causing the digital-to-analog converter 53 to generate a ramp signal having 255 steps, the lowest step being −1 volt and the highest step being +1 volt.

When the CPU 64 determines that an FM modulated video signal is being received, it measures the duration of each half cycle of the modulation carrier for each step of the ramp signal which is coupled to the positive input terminal of differential amplifier 52. The CPU then scans the stored data and determines the count (i.e. the digital equivalent of the ramp output voltage level) at which the difference between the durations of successive half cycles was a minimum, and then applies that digital value of said count to the input of digital-to-analog converter 53 to cause the output of said converter to be at the corresponding D.C. level (which results in minimum variation in the durations of successive half cycles of the FM carrier modulated at a constant frequency corresponding to picture white during the lineup interval) throughout the image transmission which follows.

When the CPU 64 determines that an AM modulated video signal is being received, it disregards the output of the zero crossing detector 65. The CPU then determines the time of occurrence of the apex of each half cycle of the AM carrier by means of the aforementioned PIA 61 internal timers 0 and 1. The CPU then commands the PIT 62 to request the analog-to-digital converter 63 to measure the amplitudes of successive half cycles of the demodulated and filtered AM video signal at the output of filter 60a; which amplitudes are input to the CPU 64 on a data bus via the PIA 61.

The CPU 64 then scans the stored data and determines the count (i.e. the digital equivalent of the ramp output voltage level) at which the difference between the amplitudes of successive half cycles was a minimum, and then applies that digital value of said count to the input of digital-to-analog converter 53 to cause the output of said converter to be at the corresponding D.C. level (which results in minimum variation in the amplitudes of successive half cycles of the AM carrier modulated at a constant amplitude corresponding to picture white during the lineup interval) throughout the image transmission which follows.

A flow chart of the logic flow of the control loops 49 and 50 appears in FIG. 5.

Automatic Offset Level Control of FM Demodulated Video Signal

In order to further process the demodulated FM video signal which appears at the output of the zero crossover interval measurement circuit 55 on line 68, it is necessary to convert the video signal amplitude to digital form, and this is done by the analog-to-digital converter 66. In order to insure that the full range of the converter 66 is utilized, it is necessary to control the D.C. level of the demodulated FM video signal on line 68 so that its peak value (corresponding to picture white) has a specified D.C. level (+10 volts in the preferred embodiment). This is accomplished by an automatic offset control arrangement identified by the control loop 66 in FIG. 1, and shown in block diagram form in FIG. 9.

The output of analog-to-digital converter 66 has a maximum digital value of 255 corresponding to picture white, which is provided when the input voltage to converter 66, i.e. the peak value of the demodulated FM video signal on line 68, is 10 volts.

The demodulated FM video signal on line 68 is coupled to the negative input terminal of a differential amplifier 69. The output of ramp generator 70 is coupled to the positive input terminal of amplifier 69, so that the output of amplifier 69, which is coupled to the input of analog-to-digital converter 66, is offset by a voltage equal to the output voltage of the ramp generator 70 (which is preferably a digital-to-analog converter). The output of the differential amplifier 69 is then equal to the amplifier gain multiplied by the difference between the ramp generator output voltage and the FM demodulated video signal voltage. That is, the peak value of the output of differential amplifier 69 is defined by the demodulated FM video signal and the output of ramp generator 70. These outputs reduce this peak value to a level corresponding to the shade of gray or white level of the image to be reproduced.

During the lineup period the video signal voltage corresponding to picture white has a maximum value at the output of differential amplifier 69. During the lineup interval the ramp control circuit 71 causes the ramp generator 70 to generate a 255 step negative slope (decreasing voltage) ramp, with the highest step of the ramp corresponding to +12 volts D.C. and the lowest step of the ramp corresponding to +8 volts D.C.

This ramp input to differential amplifier 69, at a time when the video signal on line 68 corresponds to picture white and is therefore at a maximum, causes the voltage coupled to the analog-to-digital converter 66 on line 72 to ramp downward from a value above 10 volts D.C. toward a value below the (+10 volts D.C.) upper of the converter range, which upper limit corresponds to a digital output value of 255. Therefore as the ramp progresses, the digital value at output of the converter 66 on line 73 decreases from a value greater than 255 toward a value of 255.

The comparator 74 generates an output signal to the ramp control circuit 71 to "freeze" the ramp level and prevent the ramp voltage from changing, when the digital value of the output of converter 73 is equal to 255, corresponding to a +10 volt level on line 72. The corresponding "frozen" D.C. output level of ramp generator 70 is maintain throughout the image transmission which follows, so that the output of the converter 66 has a maximum digital value corresponding to picture white.

This automatic offset compensation process is repeated each time the lineup pulse introducing a new picture transmission is received.

Automatic Scaling of FM Demodulated Video Signal

With the arrangement described above, the demodulated digitally converted FM video signal at the output of analog-to-digital converter 66 on line 73, has a digital value which is 255 when the image pel is to be white, and some lesser (nominally zero) digital value when the image pel is to be black.

However, the digital value on line 73 corresponding to black is rarely zero, since the slope of the FM demodulator/discriminator characteristic varies from unit to unit, and with aging.

Each phase lock loop within the receiver 41 has an individual FM discriminator gain. As a result, for a given deviation or change in input frequency to the FM demodulator/discriminator there are differences in the change of the output "error" voltages which constitute the demodulated FM video signal.

For example, according to a common FM transmission standard, picture white corresponds to a frequency of 1500 Hz., while picture black corresponds to a frequency of 2300 Hz. When a black phasing pulse is demodulated, however, the output voltage on line 72 corresponding to black may (after application of the offset compensation provided by control loop 67) range from a 0 to 5 volt D.C. level, depending upon the particular demodulation circuitry employed.

The control "loop" 75 (an open loop, not a feedback loop) is employed to normalize the demodulated FM signal voltage range (+10 volts for white to 0 to 5 volts for black on line 72) so that as the video signal on line 72 varies from a maximum digital value (of 255, for example) corresponding to picture white to a lesser (usually non-zero) digital value corresponding to picture black, the corresponding scaled digital video signal on line 76 varies from said maximum digital value (of 255, for example) to a digital value of zero. This normalization insures that the full dynamic range of the available digital values is always used, and therefore that the full modulation range of the acousto-optical modulator is used, resulting in use of the full dynamic range of shades of gray of the printing paper 16.

The digital scaling circuit 77 contains a number (preferably 10) of look-up tables, each corresponding to a particular digital value corresponding to a black phasing signal, i.e. to picture black. Each look-up table provides a one-to-one correlation between input digital value and output digital value, and the corresponding transfer characteristics are exemplified by the graphs of FIG. 6. That is, when the input digital signal range on line 73 is from 128 (picture black) to 255 (picture white), the scaling circuit 77 effectively expands the range so that the output digital signal on line 76 ranges from 0 (picture black) to 255 (picture white), and is correlated to the input digital signal throughout the expanded range.

To accomplish this expansion/normalization of the digital signal range, a plurality of look-up tables are stored in the scaling circuit 77, which is preferable a suitable programmed microprocessor (part of the CPU 64 in the preferred embodiment). Each look-up table corresponds to a particular range within with the digital signal on line 73 corresponding to a black phasing pulse may fall; and each table has a different slope such as to expand the limited digital white-to-black range of the digital signal on line 73 to a full (255 to zero, for example) white-to-black range of the digital signal on line 76. The greater the digital value on line 73 corresponding to picture black, the larger the slope of the corresponding scaling table stored within the scaling circuit 77.

When a black phasing pulse occurs, the gate 78 is enabled, and the comparators 79a through 79n compare the digital value of the corresponding black picture video signal with various possible values thereof. In the preferred embodiment ten comparators are used to determine in which of ten digital value ranges the black picture video signal level falls.

The scaling table selection circuit 80 then determines in which digital value range the black picture video signal falls, and provides a corresponding look-up table selection signal to the scaling circuit 77, which then expands the digital range of the signal on line 73 for the image transmission which follows, in accordance with the look-up table so selected.

The scaling process is repeated each time a black phasing pulse is received, i.e. at least once prior to the receipt of each picture image transmission.

The resulting normalized digital output signal on line 76 is coupled to a digital-to-analog converter 81, the output of which provides the desired demodulated processed FM video signal on line 82. This demodulated processed FM video signal and the demodulated filtered AM video signal on line 83 are coupled to output video line 27 via OR gate 84.

A flow chart illustrating the scaling process described above (as well as the automatic offset control provided by loop 67) is shown in FIG. 7.

Automatic Dither Control

The coherent light beam from the laser 13 is focused by the lens system which includes the focus lens 19, to provide a precisely dimensioned light spot having a Gaussian spatial energy distribution on the printing paper 16. This focused light spot is swept transversely across the paper 16 in a series of parallel scan lines by the transverse scanning action of the scan mirror 23 in conjunction with the longitudinal movement of the paper by conventional transport means (not shown).

The varying amplitude video signal input to the acousto-optical modulator driver 31 on line 30 varies the intensity of the light spot in accordance with the video information. The high carrier frequency FM dither signal to the acousto-optical modulator driver 31 on line 85 causes the focused light spot to spatially oscillate longitudinally of the paper 16, i.e. perpendicular to the transverse scan lines, with a spatial amplitude corresponding to the frequency deviation of the FM signal, i.e. to the extent of frequency modulation thereof.

As seen in FIGS. 2(b) and 2(c), due to the Gaussian spatial distribution of the energy in the focused spot, and the fact that the printing paper 16 is heat sensitive as well as light sensitive, the size of the spot printed on the paper increases as the intensity of the light beam increases, i.e. as the image is made darker. The size of the printed spot increases in both the transverse (scanning) direction as well as the longitudinal (paper transport) direction.

When the spot becomes longitudinally larger at higher beam intensity levels, the effect of dither is undesirably accentuated so that the dither spatial amplitude unduly blurs the spots of adjacent scan lines.

To compensate for the adverse effect of dither due to spot spreading in the longitudinal direction, the spatial amplitude of dither is reduced as the amplitude of the video signal on line 27 increases.

The manner in which dither spatial amplitude is varied with video signal level is seen in FIGS. 4(a) and 4(c). At (relatively white) video signal levels corresponding to relatively low beam intensity the dither spatial amplitude (as measured by the frequency deviation of the dither control signal provided by the dither frequency modulator 86—which frequency modulates the output of oscillator 87—on line 85) is at its normal level. However, as the video signal level increases toward (relatively black) higher beam intensity values, the dither spatial amplitude is correspondingly decreased to compensate for longitudinal spreading of the printed spot.

This decrease of dither spatial amplitude as the video signal level increases is provided by the frequency modulator 86, which provides a frequency modulation deviation which varies inversely with the video signal level on line 27.

Automatic Spot Size Control

Transverse spreading of the printed spot as the light intensity level of the focused spot increases, is reduced by pulse width modulating the drive signal to the acousto-optical modulator. The pulse width is reduced as the light intensity level increases, so that the energy in each pulse, i.e. in each pel, is maintained approximately constant. This pulse width modulation sharpens the pel and reduces paper "bleed".

The pulse width modulation is provided by the pulse width modulator 88, which provides pulses synchronous with clock pulses (which are synchronous with half cycles of the modulation carrier) and having pulse widths which vary inversely with the level of the video signal on line 27. The output of the pulse width modulator 88 is applied to gate 32 to allow coupling of the output of acousto-optical modulator drive circuit 31 to acousto-optical modulator 14 only during the "on" time of each pulse from the pulse width modulator 88.

The resulting video signal (not including the dither signal) applied to the acousto-optical modulator 14, i.e. the resulting variation in light beam pulse duration with video signal level, is shown in FIG. 4(b), which is drawn to the same time base as FIGS. 4(a) and 4(b).

Figure 2D:
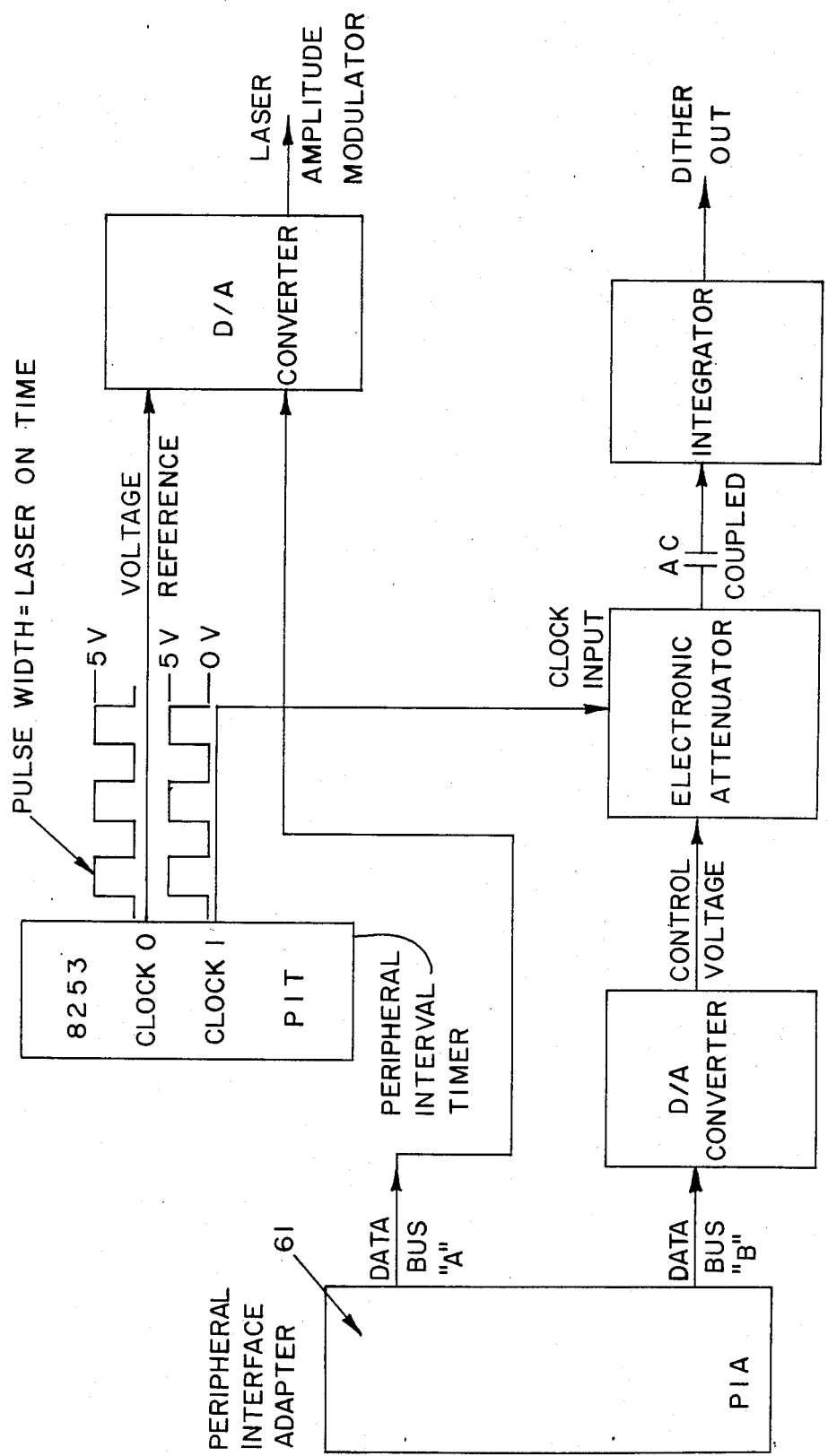
FIG. 2(d) is a block diagram of a dither control arrangement according to a feature of the present invention.
Figure 2E:
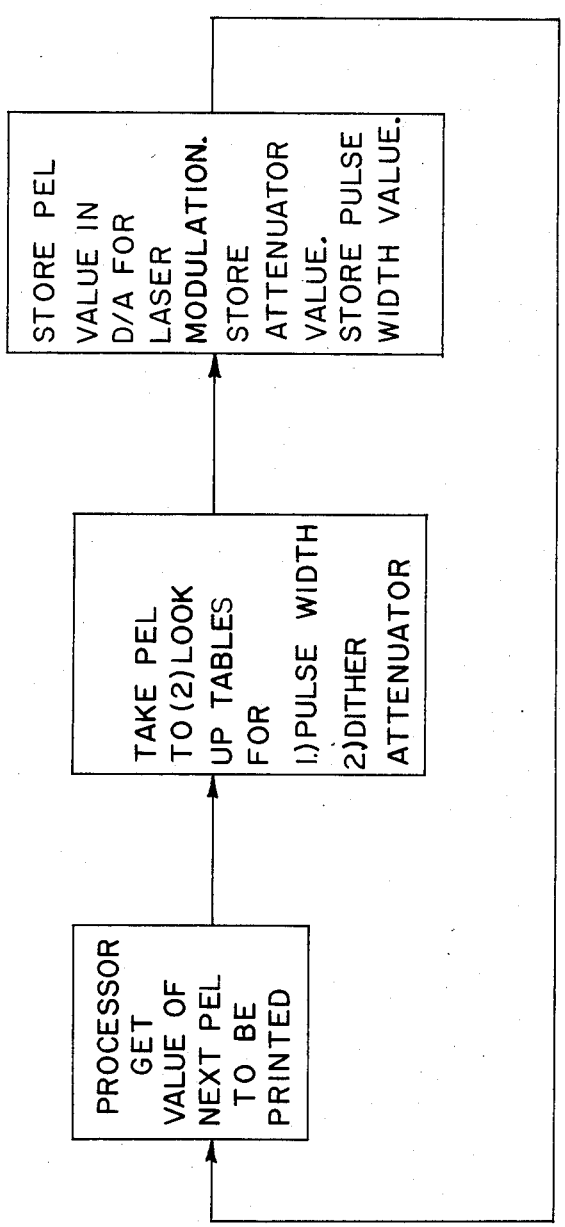
FIG. 2(e) is a flow diagram showing the dither control and spot size control arrangements according to features of the present invention.

FIG. 2(d) shows a block diagram of an analog/digital circuit arrangement for providing automatic dither control as well as automatic spot size control; while FIG. 2(e) is a flow chart thereof.

We claim:

1. A facsimile receiver for converting a received video signal containing a scan line synchronization signal to a printed image, comprising:
    transport means for moving a light sensitive record medium in a longitudinal direction;
    a light source comprising a laser having an output light beam;
    laser output intensity compensation means comprising:
        a variable transmissivity filter in the path of said light beam;
        laser intensity measuring means for generating a laser intensity signal corresponding to the intensity of the output light beam of the laser; and
        filter control means for adjusting said filter to vary the transmittance of said light beam through said filter to compensate for variations in the intensity of the output light beam of the laser;
    means for providing a dither control signal;
    optical modulator means disposed in the path of said light beam between said laser and said paper transport means, for (i) intensity modulating said light beam in accordance with the value of said video signal, and (ii) causing said light beam to dither in the longitudinal direction of said transport means with a spatial amplitude of dither corresponding to the value of said dither control signal;
    pulse width modulation control means for modulating the intensity of said light beam with a train of pulses, the pulses of said train having a width varying in inverse relation to the value of said video signal;
    dither control means for varying the value of said dither control signal to cause the spatial amplitude of dither to vary inversely with the value of said video signal;
    lens means for focusing said light beam on any light sensitive record medium coupled to said transport means;
    scan means for deflecting said light beam in a transverse direction, in synchronism with the synchronization signal contained in said video signal, to generate a series of scan lines on said record medium corresponding to said printed image; and
    dynamic focus control means coupled to said scan means for varying the focal point of said lens means in synchronism with the transverse deflection of said light beam along each of said scan lines, to maintain said light beam in focus on said record medium.

2. The facsimile receiver according to claim 1, wherein said scan means comprises a scan mirror and means for rotatably reciprocating the mirror, said transport means supporting said record medium on a planar surface, said lens means comprising at least one focus lens, said dynamic focus control means varying the position of said focus lens in accordance with the angle of rotation of said scan mirror.

3. The facsimile receiver according to claim 1, wherein said received video signal is amplitude modulated on a carrier signal, and includes a lineup interval preceding the video signal corresponding to a desired picture image, the amplitude of said carrier signal upon transmission of said received video signal to said receiver being originally constant during said lineup interval, the amplitude of said received carrier signal varying between successive half cycles due to D.C. offset occurring in the course of transmission or in said receiver, said receiver further comprising:
    a ramp generator for generating a ramp signal during the lineup interval:
    AM signal combining means for combining the ramp signal with the received video signal to provide a composite signal having a D.C. level corresponding to the D.C. level of said received video signal shifted by an amount corresponding to the value of said ramp signal;
    AM demodulating means for rectifying and filtering said composite signal to provide a demodulated AM video signal;
    AM comparator means coupled to said AM demodulating means for comparing the amplitude of said demodulated AM video signal at times corresponding to half cycle peaks of the carrier signal, with the amplitude of said demodulated AM video signal at times corresponding to adjacent half cycle peaks of said demodulated AM video signal, to provide a half cycle to half cycle difference signal;
    minimum value determination means for determining a ramp signal parameter corresponding to the minimum value of said half cycle to half cycle difference signal; and
    ramp control means coupled to said minimum value determination means for causing the ramp generator, after said lineup interval, to provide to said AM signal combining means a D.C. level corresponding to said ramp signal parameter, so that said D.C. offset is substantially eliminated.

4. The facsimile receiver according to claim 1, wherein said received video signal is frequency modulated on a carrier signal, and includes a lineup interval preceding the video signal corresponding to a desired picture image, the frequency of said carrier signal upon transmission of said received video signal to said receiver being originally constant during said lineup interval, the duration of said received carrier signal varying between successive half cycles due to D.C. offset occurring in the course of transmission or in said receiver, said receiver further comprising:
  a ramp generator for generating a ramp signal during the lineup interval;
  FM signal combining means for combining the ramp signal with the received video signal to provide a composite signal having a D.C. level corresponding to the D.C. level of said received video signal shifted by an amount corresponding to the value of said ramp signal;
  FM demodulator means for determining the durations of successive half cycles of said composite signal to provide a demodulated FM video signal;
  FM comparator means coupled to said FM demodulator means for comparing the durations of said successive half cycles of said composite FM video signal with the durations of adjacent half cycles thereof, to provide a half cycle to half cycle difference signal;
  minimum value determination means for determining a ramp signal parameter corresponding to the minimum value of said half cycle to half cycle difference signal; and
  ramp control means coupled to said minimum value determination means for causing the ramp generator, after said lineup interval, to provide to said FM signal combining means a D.C. level corresponding to said ramp signal parameter, so that said D.C. offset is substantially eliminated.

5. The facsimile receiver according to claim 1, wherein said optical modulator means includes:
  a beam splitter for providing an optical sample of the intensity modulated light beam output of said optical modulator means;
  a photosensor responsive to said optical sample for generating a modulator output intensity signal corresponding to the intensity of said modulated light beam output of said optical modulator means;
  a comparator for comparing said modulator output intensity signal with said video signal to provide a modulator intensity control signal; and
  means for coupling said modulator intensity control signal to said optical modulator means to cause the intensity of said modulated light beam output of said optical modulator means to correspond to said video signal.

6. The facsimile receiver according to claim 1, wherein said received video signal is frequency modulated on a carrier signal, and includes a lineup interval preceding the video signal corresponding to a desired picture image, the frequency of said received video signal being constant during said lineup interval at a value corresponding to picture white, further comprising:
  means for demodulating said received video signal to provide an FM demodulated video signal;
  a ramp generator for generating a ramp signal during the lineup interval;
  automatic offset control combining means for combining the ramp signal with the FM demodulated video signal to provide a demodulated FM composite signal having a D.C. level corresponding to the D.C. level of said FM demodulated video signal shifted by an amount corresponding to the value of said ramp signal;
  analog-to-digital converter means for converting said demodulated FM composite signal to a corresponding demodulated FM composite digital signal;
  digital comparator means for comparing said demodulated FM composite digital signal with a digital value corresponding to the desired digital value for picture white, and for generating an offset level control signal when said digital value is equal to said digital signal; and
  ramp control means responsive to said offset level control signal for causing the ramp generator to provide to said automatic offset control combining means a D.C. level corresponding to the D.C. value of said ramp signal at the time of occurrence of said offset level control signal, so that the output of said analog-to-digital converter means has said desired digital value when the D.C. level of said FM demodulated video signal corresponds to picture white.

7. The facsimile receiver according to claim 1, wherein said received video signal is frequency modulated on a carrier signal and includes a black phasing pulse having a frequency corresponding to picture black, further comprising:
  means for demodulating said received video signal to provide an FM demodulated video signal;
  comparator means operative during the occurrence of said black phasing pulse for generating a transfer characteristic selection signal identifying that one of a plurality of value ranges into which the value of said FM demodulated video signal falls;
  a scaling circuit coupled to said comparator means and responsive to said transfer characteristic selection signal for expanding the dynamic range of said FM demodulated video signal according to a selected one of a corresponding plurality of transfer characteristics corresponding to said one value range, to provide an output FM demodulated video signal having a predetermined dynamic range.

8. A facsimile receiver for converting a received video signal containing a scan line synchronization signal to a printed image, comprising:
  transport means for moving a light sensitive record medium in a longitudinal direction;
  a light source comprising a laser having an output light beam;
  optical modulator means disposed in the path of said light beam between said laser and said transport means, for intensity modulating said light beam in accordance with the value of said video signal;
  pulse width modulation control means for modulating the intensity of said light beam with a train of pulses, the pulses of said train having a width varying in inverse relation to the value of said video signal, so that portions of said light beam of higher intensity have a shorter pulse duration than portions of said light beam of lower intensity;

lens means for focusing said light beam on any light sensitive record medium coupled to said transport means; and scan means for deflecting said light beam in a transverse direction, in synchronism with the synchronization signal contained in said video signal, to generate a series of adjacent scan lines on said record medium corresponding to said printed image;

whereby the tendency of portions of said printed image corresponding to higher intensity portions of said light beam to have a spot size on said record medium greater than the spot size of portions of said printed image corresponding to lower intensity portions of said light beam, is reduced.

9. A facsimile receiver for converting a received video signal containing a scan line synchronization signal to a printed image, comprising:

a light source comprising a laser having an output light beam;

transport means for moving a light sensitive record medium in a longitudinal direction;

optical modulator means disposed in the path of said light beam between said laser and said transport means, for intensity modulating said light beam in accordance with the value of said video signal;

lens means for focusing said light beam on any light sensitive record medium coupled to said transport means;

scan means for deflecting said light beam in a transverse direction, in synchronism with the synchronization signal contained in said video signal, to generate a series of adjacent scan lines on said record medium corresponding to said printed image; and dynamic focus control means coupled to said scan means for varying the focal point of said lens means in synchronism with the transverse deflection of said light beam along each of said scan lines, to maintain said light beam in focus on said record medium.

10. The facsimile receiver according to claim 9, wherein said scan means comprises a scan mirror and means for rotatably reciprocating the mirror, said transport means supporting said record medium on a planar surface, said lens means comprising at least one focus lens, said dynamic focus control means varying the position of said focus lens along the path of said light beam in accordance with the angle of rotation of said scan mirror.

11. A facsimile receiver for converting a received video signal containing a scan line synchronization signal to a printed image, comprising:

a light source comprising a laser having an output light beam;

transport means for moving a light sensitive record medium in a longitudinal direction;

means for providing a dither control signal;

optical modulator means disposed in the path of said light beam between said laser and said transport means, for (i) intensity modulating said light beam in accordance with the value of said video signal, and (ii) causing said light beam to dither in the longitudinal direction of said paper transport means with a spatial amplitude of dither corresponding to the value of said dither control signal;

dither control means for varying the value of said dither control signal to cause the spatial amplitude of dither to vary inversely with the value of said video signal;

lens means for focusing said light beam on any light sensitive record medium coupled to said transport means; and scan means for deflecting said light beam in a transverse direction, in synchronism with the synchronization signal contained in said video signal, to generate a series of adjacent scan lines on said record medium corresponding to said printed image.

12. In a facsimile receiver employing a laser for converting a received video signal containing a scan line synchronization signal and at least one black level indicating signal to a printed image, an arrangement for compensating for variations in the intensity of the lser output due to aginst and the like, comprising:

a light source comprising a laser having an output light beam;

laser output intensity compensation means comprising:

a variable transmissivity filter in the path of said light beam;

laser intensity measuring means operative at the time of occurrence of said black level indicating signal for generating a laser intensity signal corresponding to the black level intensity of the output light beam of the laser; and filter control means for adjusting said filter to vary the transmittance of said light beam through said filter to compensate for variations in the intensity of the output light beam of the laser due to aging and the like, so as to maintain said black level intensity at a predetermined constant value;

transport means for moving a light sensitive record medium in a longitudinal direction;

optical modulator means disposed in the path of said light beam between said laser and said transport means, for intensity modulating said light beam in accordance with the value of said video signal;

lens means for focusing said light beam on any light sensitive record medium coupled to said transport means; and scan means for deflecting said light beam in a transverse direction, in synchronism with the synchronization signal contained in said video signal, to generate a series of adjacent scan lines on said record medium corresponding to said printed image.

13. A facsimile receiver for converting a received video signal containing a scan line synchronization signal to a printed image, comprising:

a light source comprising a laser having an output light beam;

transport means for moving a light sensitive record medium in a longitudinal direction;

optical modulator means disposed in the path of said light beam between said laser and said transport means, for intensity modulating said light beam in accordance with the value of said video signal, said optical modulator means comprising:

a beam splitter for providing an optical sample of the intensity modulated light beam output of said optical modulator means;

a photosensor responsive to said optical sample for generating a modulator output intensity signal corresponding to the intensity of said modulated light beam output of said optical modulator means;

a comparator for comparing said modulator output intensity signal with said video signal to provide a modulator intensity control signal; and means for coupling said modulator intensity control signal to said optical modulator means to cause the intensity of said modulated light beam output of said optical modulator means to correspond to said video signal;

lens means for focusing said light beam on any light sensitive record medium coupled to said transport means; and scan means for deflecting said light beam in a transverse direction, in synchronism with the synchronization signal contained in said video signal, to generate a series of adjacent scan lines on said record medium corresponding to said printed image.

14. A facsimile receiver for converting a received video signal to a printed image, said received video signal being amplitude modulated on a carrier signal, and including a lineup interval preceding the video signal corresponding to a desired picture image and a scan line synchronization signal, the amplitude of said carrier signal upon transmission of said received video signal to said receiver being originally constant during said lineup interval, the amplitude of said received carrier signal varying between successive half cycles due to D.C. offset occurring in the course of transmission or in said receiver, comprising:

a light source comprising a laser having an output light beam;

transport means for moving a light sensitive record medium in a longitudinal direction;

a ramp generator for generating a ramp signal during the lineup interval;

AM signal combining means for combining the ramp signal with the received video signal to provide a composite signal having a D.C. level corresponding to the D.C. level of said received video signal shifted by an amount corresponding to the value of said ramp signal;

AM demodulating means for rectifying and filtering said composite signal to provide a demodulated AM video signal;

AM comparator means coupled to said AM demodulating means for comparing the amplitude of said demodulated AM video signal at times corresponding to half cycle peaks of the carrier signal, with the amplitude of said demodulated AM video signal at times corresponding to adjacent half cycle peaks of said demodulated AM video signal, to provide a half cycle to half cycle difference signal;

minimum value determination means for determining a ramp signal parameter corresponding to the minimum value of said half cycle to half cycle difference signal;

ramp control means coupled to said minimum value determination means for causing the ramp generator, after said lineup interval, to provide to said AM signal combining means a D.C. level corresponding to said ramp signal parameter, so that said D.C. offset is substantially eliminated;

optical modulator means disposed in the path of said light beam between said laser and said transport means, for intensity modulating said light beam in accordance with the value of said demodulated AM video signal;

lens means for focusing said light beam on any light sensitive record medium coupled to said transport means; and scan means for deflecting said light beam in a transverse direction, in synchronism with the synchronization signal contained in said video signal, to generate a series of adjacent scan lines on said record medium corresponding to said printed image.

15. A facsimile receiver for converting a received video signal to a desired printed image, said received video signal being frequency modulated on a carrier signal and including a lineup interval preceding the video signal corresponding to a desired picture image and a scan line synchronization signal, the frequency of said carrier signal upon transmission of said received video signal to said receiver being originally constant during said lineup interval, the duration of said received carrier signal varying between successive half cycles due to D.C. offset occurring in the course of transmission or in said receiver, comprising:

a light source comprising a laser having an output light beam;

transport means for moving a light sensitive record medium a longitudinal direction;

a ramp generator for generating a ramp signal during the lineup interval;

FM signal combining means for combining the ramp signal with the received video signal to provide a composite signal having a D.C. level corresponding to the D.C. level of said received video signal shifted by an amount corresponding to the value of said ramp signal;

FM demodulator means for determining the durations of successive half cycles of said composite signal to provide a demodulated FM video signal;

FM comparator means coupled to said FM demodulator means for comparing the durations of said successive half cycles of said composite FM video signal with the durations of adjacent half cycles thereof, to provide a half cycle to half cycle difference signal;

minimum value determination means for determining a ramp signal parameter corresponding to the minimum value of said half cycle to half cycle difference signal;

ramp control means coupled to said minimum value determination means for causing the ramp generator, after said lineup interval, to provide to said FM signal combining means a D.C. level corresponding to said ramp signal parameter, so that said D.C. offset is substantially eliminated;

optical modulator means disposed in the path of said light beam between said laser and said transport means, for intensity modulating said light beam in accordance with the value of said video signal;

lens means for focusing said light beam on any light sensitive record medium coupled to said transport means; and scan means for deflecting said light beam in a transverse direction, in synchronism with the synchronization signal contained in said video signal, to generate a series of adjacent scan lines on said record medium corresponding to said printed image.

16. A facsimile receiver for converting a received video signal to a printed image, said received video signal being frequency modulated on a carrier signal, and including a lineup interval preceding the video signal corresponding to a desired picture image and a scan line synchronization signal, the frequency of said received video signal being constant during said lineup interval at a value corresponding to picture white, comprising:
  a light source comprising a laser having an output light beam;
  transport means for moving a light sensitive record medium in a longitudinal direction;
  means for demodulating said received video signal to provide an FM demodulated video signal;
  a ramp generator for generating a ramp signal during the lineup interval;
  automatic offset control combining means for combining the ramp signal with the FM demodulated video signal to provide a demodulated FM composite video signal having a D.C. level corresponding to the D.C. level of said FM demodulated video signal shifted by an amount corresponding to the value of said ramp signal;
  analog-to-digital converter means for converting said demodulated FM composite video signal to a corresponding demodulated FM composite digital video signal;
  digital comparator means for comparing said demodulated FM composite digital video signal with a digital value corresponding to the desired digital value for picture white, and for generating an offset level control signal when said digital value is equal to said demodulated FM composite digital video signal; and
  ramp control means responsive to said offset level control signal for causing the ramp generator to provide to said automatic offset control combining means a D.C. level corresponding to the D.C. value of said ramp signal at the time of occurrence of said offset level control signal, so that the output of said analog-to-digital converter means has said desired digital value when the D.C. level of said FM demodulated video signal corresponds to picture white;
  optical modulator means disposed in the path of said light beam between said laser and said transport means, for intensity modulating said light beam in accordance with the value of said demodulated FM composite digital video signal;
  lens means for focusing said light beam on any light sensitive record medium coupled to said transport means; and
  scan means for deflecting said light beam in a transverse direction, in synchronism with the synchronization signal contained in said video signal, to generate a series of adjacent scan lines on said record medium corresponding to said printed image.

17. A facsimile receiver for converting a received video signal to a printed image, said received video signal being frequency modulated on a carrier signal and including a black phasing pulse having a frequency corresponding to picture black and a scan line synchronization signal, comprising:
  a light source comprising a laser having an output light beam;
  transport means for moving a light sensitive record medium in a longitudinal direction;
  means for demodulating said received video signal to provide an FM demodulated video signal;
  comparator means operative during the occurrence of said black phasing pulse for generating a transfer characteristic selection signal identifying that one of a plurality of value ranges into which the value of said FM demodulated video signal falls;
  a scaling circuit coupled to said comparator means and responsive to said transfer characteristic selection signal for expanding the dynamic range of said FM demodulated video signal according to a selected one of a corresponding plurality of transfer characteristics corresponding to said one value range, to provide an output FM demodulated video signal having a predetermined dynamic range;
  optical modulator means disposed in the path of said light beam between said laser and said transport means, for intensity modulating said light beam in accordance with the value of said video signal;
  lens means for focusing said light beam on any light sensitive record medium coupled to said transport means; and
  scan means for deflecting said light beam in a transverse direction, in synchronism with the synchronization signal contained in said video signal, to generate a series of adjacent scan lines on said record medium corresponding to said printed image.

18. A method for converting a received facsimile video signal containing a scan line synchronization signal to a printed image, comprising the steps of:
  providng an output light beam;
  moving a light sensitive record medium in a longitudinal direction;
  intensity modulating said light beam in accordance with the value of said video signal, by the steps of:
    providing an optical sample of the intensity modulated light beam,
    generating a modulator output intensity signal corresponding to the intensity of said modulated light beam,
    comparing said modulator output intensity signal with said video signal to provide a modulator intensity control signal, and
    utilizing said modulator intensity control signal to cause the intensity of said modulated light beam to correspond to said video signal;
  focusing said light beam on any light sensitive record medium coupled to said transport means; and
  deflecting said light beam in a transverse direction, in synchronism with the synchronization signal contained in said video signal, to generate a series of adjacent scan lines on said record medium corresponding to said printed image.

19. A method employing a laser for converting a received facsimile video signal containing at least one black level indicating signal and a scan line synchronization signal to a printed image, and for compensating for variations in the intensity of the laser output due to aging and the like, comprising the steps of:
  providing an output light beam from a laser;
  providing a variable transmissivity filter in the path of said light beam;
  generating a laser intensity signal corresponding to the black level intensity of the output light beam of the laser at the output side of said filter at the time of occurence of said black level indicating signal;
  adjusting said filter to vary the transmittance of said light beam through said filter to compensate for variations in the intensity of the output light beam due to aging and the like, so as to maintain said black level intensity at a predetermined constant value;

moving a light sensitive record medium in a longitudinal direction;

intensity modulating said light beam in accordance with the value of said video signal;

focusing said light beam on said light sensitive record medium; and deflecting said light beam in a transverse direction, in synchronism with the synchronization signal contained in said video signal, to generate a series of adjacent scan lines on said record medium corresponding to said printed image.

20. The method according to claim 19, comprising the additional step of generating a warning signal when the highest transmissivity portion of said filter is in the path of said light beam and said laser intensity signal is below a predetermined threshold value.

21. The method according to claim 19, comprising the additional step of adjusting said filter at the time of occurrence of said black phasing signal.

22. A method for converting a received facsimile video signal containing a scan line synchronization signal to a printed image, comprising the steps of:

providing an output light beam;

moving a light sensitive record medium in a longitudinal direction;

intensity modulating said light beam in accordance with the value of said video signal;

focusing said light beam to a point on any light sensitive record medium coupled to said transport means;

deflecting said light beam in a transverse direction, in synchronism with the synchronization signal contained in said video signal, to generate a series of adjacent scan lines on said record medium corresponding to said printed image; and varying the focal point of said light beam in synchronism with the transverse deflection of said light beam along each of said scan lines, to maintain said light beam in focus on said record medium.

23. The method according to claim 22, wherein said focal point of said light beam is varied by advancing and retracting a focus lens toward and away from said record medium along the path of the beam.

24. The method according to claim 23, wherein said focus lens is advanced and retracted a distance which varies sinusoidally with the deflection of said light beam.

25. A method for converting a received facsimile video signal to a printed image, said received video signal being amplitude modulated on a carrier signal and including a lineup interval preceding the video signal corresponding to a desired picture image and a scan line synchronization signal, the amplitude of said carrier signal upon transmission of said received video signal to said receiver being originally constant during said lineup interval, the amplitude of said received carrier signal varying between successive half cycles due to D.C. offset occurring in the course of transmission or in said receiver, said method comprising the steps of:

providing an output light beam;

moving a light sensitive record medium in a longitudinal direction;

generating a ramp signal during the lineup interval;

combining the ramp signal with the received video signal to provide a composite signal having a D.C. level corresponding to the D.C. level of said received video signal shifted by an amount corresponding to the value of said ramp signal;

rectifying and filtering said composite signal to provide a demodulated AM video signal;

comparing the amplitude of said demodulated AM video signal at times corresponding to half cycle peaks of the carrier signal, with the amplitude of said demodulated AM video signal at times corresponding to adjacent half cycle peaks of said demodulated AM video signal, to provide a half cycle to half cycle difference signal;

determining a ramp signal parameter corresponding to the minimum value of said half cycle to half cycle difference signal;

causing the ramp generator, after said lineup interval, to provide to said AM signal combining means a D.C. level corresponding to said ramp signal parameter, so that said D.C. offset is substantially eliminated;

intensity modulating said light beam in accordance with the value of said demodulated AM video signal;

focusing said light beam on any light sensitive record medium coupled to said transport means; and deflecting said light beam in a transverse direction, in synchronism with the synchronization signal contained in said video signal, to generate a series of adjacent scan lines on said record medium corresponding to said printed image.

26. A method for converting a received facsimile video signal to a desired printed image, said received video signal being frequency modulated on a carrier signal and including a lineup interval preceding the video signal corresponding to a desired picture image and a scan line synchronization signal, the frequency of said carrier signal upon transmission of said received video signal to said receiver being originally constant during said lineup interval, the duration of said received carrier signal varying between successive half cycles due to D.C. offset occurring in the course of transmission or in said receiver, said method comprising the steps of:

providing an output light beam;

moving a light sensitive record medium in a longitudinal direction;

generating a ramp signal during the lineup interval;

combining the ramp signal with the received video signal to provide a composite signal having a D.C. level corresponding to the D.C. level of said received video signal shifted by an amount corresponding to the value of said ramp signal;

determining the durations of successive half cycles of said composite signal to provide a demodulated FM video signal;

comparing the durations of said successive half cycles of said composite FM video signal with the durations of adjacent half cycles thereof, to provide a half cycle to half cycle difference signal;

determining a ramp signal parameter corresponding to the minimum value of said half cycle to half cycle difference signal;

causing the ramp generator, after said lineup interval, to provide to said FM signal combining means a D.C. level corresponding to said ramp signal parameter, so that said D.C. offset is substantially eliminated;

demodulating said composite signal to provide a demodulate FM video signal;

intensity modulating said light beam in accordance with the value of said demodulated FM video signal;

focusing said light beam on any light sensitive record medium coupled to said transport means; and deflecting said light beam in a transverse direction, in synchronism with the synchronization signal contained in said video signal, to generate a series of adjacent scan lines on said record medium corresponding to said printed image.

27. A method for converting a received facsimile video signal to a printed image, said received video signal being frequency modulated on a carrier signal, and including a lineup interval preceding the video signal corresponding to a desired picture image and a scan line synchronization signal, the frequency of said received video signal being constant during said lineup interval at a value corresponding to picture white, comprising the steps of:

providing an output light beam;

moving a light sensitive record medium in a longitudinal direction;

demodulating said received video signal to provide an FM demodulated video signal;

generating a ramp signal during the lineup interval;

combining the ramp signal with the FM demodulated video signal to provide a demodulated FM composite video signal having a D.C. level corresponding to the D.C. level of said FM demodulated video signal shifted by an amount corresponding to the value of said ramp signal;

converting said demodulated FM composite video signal to a corresponding demodulated FM composite digital video signal;

comparing said demodulated FM composite digital video signal with a digital value corresponding to the desired digital value for picture white, and generating an offset level control signal when said digital value is equal to the digital value of said demodulated FM composite digital video signal; and providing a D.C. level corresponding to the D.C. value of said ramp signal at the time of occurrence of said offset level control signal, so that said FM composite digital video signal has said desired digital value when the D.C. level of said FM demodulated video signal corresponds to picture white;

intensity modulating said light beam in accordance with the value of said demodulated FM composite digital video signal;

focusing said light beam on any light sensitive record coupled to said transport means; and deflecting said light beam in a transverse direction, in synchronism with the synchronization signal contained in said video signal, to generate a series of adjacent scan lines on said record medium corresponding to said printed image.

28. A method for converting a received facsimile video signal to a printed image, said received video signal being frequency modulated on a carrier signal and including a black phasing pulse having a frequency corresponding to picture black and a scan line synchronization signal, comprising the steps of:

providing an output light beam;

moving a light sensitive record medium in a longitudinal direction;

demodulating said received video signal to provide an FM demodulated video signal;

during the occurrence of said black phasing pulse, generating a transfer characteristic selection signal identifying that one of a plurality of value ranges into which the value of said FM demodulated video signal falls;

expanding the dynamic range of said FM demodulated video signal according to a selected one of a corresponding plurality of transfer characteristics corresponding to said one value range, to provide an output FM demodulated video signal having a predetermined dynamic range;

intensity modulating said light beam in accordance with the value of said output FM demodulated video signal;

focusing said light beam on any light sensitive record medium coupled to said transport means; and deflecting said light beam in a transverse direction, in synchronism with the synchronization signal contained in said video signal, to generate a series of adjacent scan lines on said record medium corresponding to said printed image.

29. A method for converting a received facsimile video signal containing a scan line synchronization signal to a printed image, comprising the steps of:

providing an output light beam;

moving a light sensitive record medium in a longitudinal direction;

providing a dither control signal;

intensity modulating said light beam in accordance with the value of said video signal;

causing said light beam to dither in the longitudinal direction of said paper transport means with a spatial amplitude of dither corresponding to the value of said dither control signal;

varying the value of said dither control signal to cause the spatial amplitude of dither to vary inversely with the value of said video signal;

focusing said light beam on any light sensitive record medium coupled to said transport means; and deflecting said light beam in a transverse direction, in synchronism with the synchronization signal contained in said video signal, to generate a series of adjacent scan lines on said record medium corresponding to said printed image.

30. A method for converting a received facsimile video signal containing a scan line synchronization signal to a printed image, comprising the steps of:

providing an output light beam;

moving a light sensitive record medium in a longitudinal direction;

intensity modulating said light beam in accordance with the value of said video signal;

modulating the intensity of said light beam with a train of pulses, the pulses of said train having a width varying in inverse relation to the value of said video signal, so that portions of said light beam of higher intensity have a shorter pulse duration than portions of said light beam of lower intensity;

focusing said light beam on any light sensitive record medium coupled to said transport means; and deflecting said light beam in a transverse direction, in synchronism with the synchronization signal contained in said video signal, to generate a series of adjacent scan lines on said record medium corresponding to said printed image;

whereby the tendency of portions of said printed image corresponding to higher intensity portions of said light beam to have a spot size on said record medium greater than the spot size of portions of said printed image corresponding to lower intensity portions of said light beam, is reduced.

31. A method for converting a received facsimile video signal containing a black phasing signal and a scan line synchronization signal to a printed image, comprising the steps of:
provviding an output light beam;
providing a variable transmissivity filter in the path of said light beam;
generating a laser intensity signal corresponding to the intensity of the output light beam of the laser at the output side of said filter;
adjusting said filter to vary the transmittance of said light beam through said filter to compensate for variations in the intensity of the output light beam;
moving a light sensitive record medium in a longitudinal direction;
intensity modulating said light beam in accordance with the value of said video signal;
focusing said light beam on said light sensitive record medium;
deflecting said light beam in a traverse direction, in synchronism with the synchronization signal contained in said video signal, to generate a series of adjacent scan lines on said record medium corresponding to said printed image; and
generating a warning signal when the highest transmissivity portion of said filter is in the path of said light beam and said laser intensity signal is below a predetermined threshold value.

32. A method for converting a received facsimile video signal containing a black phasing signal and a scan line synchronization signal to a printed image, comprising the steps of:
providing an output light beam;
providing a variable transmissivity filter in the path of said light beam;
generating a laser intensity signal corresponding to the intensity of the output light beam of the laser at the output side of said filter;
adjusting said filter at the time of occurrence of said black phasing signal to vary the transmittance of said light beam through said filter to compensate for variations in the intensity of the output light beam;
moving a light sensitive record medium in a longitudinal direction;
intensity modulating said light beam in accordance with the value of said video signal;
focusing said light beam on said light sensitive record medium;
deflecting said light beam in a transverse direction, in synchronism with the synchronization signal contained in said video signal, to generate a series of adjacent scan lines on said record medium corresponding to said printed image.

* * * * *